United States Patent
Kelley et al.

(10) Patent No.: US 11,762,646 B2
(45) Date of Patent: *Sep. 19, 2023

(54) SECURELY UPDATING SOFTWARE ON CONNECTED ELECTRONIC DEVICES

(71) Applicant: Block, Inc., San Francisco, CA (US)

(72) Inventors: John Kelley, San Francisco, CA (US); Max Guise, San Francisco, CA (US); Todor Ristov, San Bruno, CA (US); Imran Khan, San Rafael, CA (US); Eric Monti, San Francisco, CA (US)

(73) Assignee: Block, Inc., Oakland, CA (US)

( * ) Notice: Subject to any disclaimer, the term of this patent is extended or adjusted under 35 U.S.C. 154(b) by 156 days.

This patent is subject to a terminal disclaimer.

(21) Appl. No.: 17/201,367

(22) Filed: Mar. 15, 2021

(65) Prior Publication Data
US 2021/0255848 A1  Aug. 19, 2021

Related U.S. Application Data

(63) Continuation of application No. 15/636,356, filed on Jun. 28, 2017, now Pat. No. 10,949,189.

(51) Int. Cl.
*G06F 8/65* (2018.01)
*G06Q 20/20* (2012.01)
(Continued)

(52) U.S. Cl.
CPC ............... *G06F 8/65* (2013.01); *G06F 8/71* (2013.01); *G06Q 20/20* (2013.01); *G06Q 20/34* (2013.01);
(Continued)

(58) Field of Classification Search
CPC ...... G06Q 20/20; G06Q 20/34; G06Q 20/202; G06Q 20/3829; G06Q 20/00; G06F 8/65; G06F 8/71; G06F 8/654; G06F 8/658
See application file for complete search history.

(56) References Cited

U.S. PATENT DOCUMENTS

| 3,128,349 A | 4/1964 | Boesch et al. |
| 4,776,003 A | 10/1988 | Harris |
| (Continued) | | |

FOREIGN PATENT DOCUMENTS

| AU | 2324402 A | 6/2002 |
| CN | 1630988 A | 6/2005 |
| (Continued) | | |

OTHER PUBLICATIONS

Manuel Mendonca et al.; Secure Application Updates on Point of Sale Devices; ICETE; 8 pages; retrieved on May 1, 2023 (Year: 2004).*

(Continued)

*Primary Examiner* — S. Sough
*Assistant Examiner* — Cuong V Luu
(74) *Attorney, Agent, or Firm* — Lee & Hayes, P.C.

(57) ABSTRACT

Techniques are described for securely updating a point-of-sale (POS) system that includes a merchant-facing device and a buyer-facing device. For instance, the merchant-facing device may execute first software that provides first POS functionality and the buyer-facing device may execute second software that provides second POS functionality. To update both devices, the merchant-facing device may receive a software update from a payment service via a network connection, and update the first software using the software update. The merchant-facing device can then cause, via a physical connection, the buyer-facing device to reboot in an update mode and send the software update to the buyer-facing device. In response, the buyer-facing device can update the second software using the software update and then reboot in a payments mode. In some instances, the buyer-facing device can then update a secure enclave on the buyer-facing device using the software update.

20 Claims, 9 Drawing Sheets

(51) Int. Cl.
　　*G06F 8/71*　　　(2018.01)
　　*G06Q 20/34*　　(2012.01)
　　*G06Q 20/38*　　(2012.01)

(52) U.S. Cl.
　　CPC ..... *G06Q 20/3829* (2013.01); *G06Q 2220/00* (2013.01)

(56) References Cited

U.S. PATENT DOCUMENTS

| | | |
|---|---|---|
| 4,860,336 A | 8/1989 | D'Avello et al. |
| 5,221,838 A | 6/1993 | Gutman et al. |
| 5,351,296 A | 9/1994 | Sullivan |
| 5,388,155 A | 2/1995 | Smith |
| 5,408,513 A | 4/1995 | Busch, Jr. et al. |
| 5,714,741 A | 2/1998 | Pieterse et al. |
| 5,729,591 A | 3/1998 | Bailey |
| 5,740,232 A | 4/1998 | Pailles et al. |
| 5,838,773 A | 11/1998 | Eisner et al. |
| 5,850,599 A | 12/1998 | Seiderman |
| 5,867,795 A | 2/1999 | Novis et al. |
| 5,940,510 A | 8/1999 | Curry et al. |
| 6,010,067 A | 1/2000 | Elbaum |
| 6,098,881 A | 8/2000 | Deland, Jr. et al. |
| 6,144,336 A | 11/2000 | Preston et al. |
| 6,234,389 B1 | 5/2001 | Valliani et al. |
| 6,278,779 B1 | 8/2001 | Bryant et al. |
| 6,360,362 B1 | 3/2002 | Fichtner et al. |
| 6,481,623 B1 | 11/2002 | Grant et al. |
| 6,886,742 B2 | 5/2005 | Stoutenburg et al. |
| 6,990,683 B2 | 1/2006 | Itabashi |
| 7,003,316 B1 | 2/2006 | Elias et al. |
| 7,066,382 B2 | 6/2006 | Kaplan |
| 7,083,090 B2 | 8/2006 | Zuili |
| 7,163,148 B2 | 1/2007 | Durbin et al. |
| 7,210,627 B2 | 5/2007 | Morley et al. |
| 7,363,054 B2 | 4/2008 | Elias et al. |
| 7,398,922 B2 * | 7/2008 | Hayashi ................ G06Q 10/00 235/383 |
| 7,424,732 B2 | 9/2008 | Matsumoto et al. |
| 7,433,452 B2 | 10/2008 | Taylor et al. |
| 7,591,425 B1 | 9/2009 | Zuili et al. |
| 7,673,799 B2 | 3/2010 | Hart et al. |
| 7,810,729 B2 | 10/2010 | Morley, Jr. |
| 7,896,248 B2 | 3/2011 | Morley, Jr. |
| 8,086,531 B2 | 12/2011 | Litster et al. |
| 8,126,734 B2 | 2/2012 | Dicks et al. |
| 8,265,553 B2 | 9/2012 | Cheon et al. |
| 8,397,988 B1 | 3/2013 | Zuili |
| 8,498,213 B2 | 7/2013 | Gnanasekaran et al. |
| 8,542,583 B2 | 9/2013 | Gnanasekaran et al. |
| 8,588,075 B2 | 11/2013 | Gnanasekaran et al. |
| 8,593,965 B2 | 11/2013 | Rongong et al. |
| 8,599,691 B2 | 12/2013 | Gnanasekaran et al. |
| 8,767,561 B2 | 7/2014 | Gnanasekaran et al. |
| 8,792,354 B2 | 7/2014 | Gnanasekaran et al. |
| 8,797,877 B1 | 8/2014 | Perla et al. |
| 9,020,853 B2 | 4/2015 | Hoffman et al. |
| 9,264,889 B2 | 2/2016 | Choi-Grogan et al. |
| 9,268,555 B2 | 2/2016 | Djabarov et al. |
| 9,411,574 B2 | 8/2016 | Kostadinov et al. |
| 9,489,496 B2 | 11/2016 | Wysocki et al. |
| 9,543,653 B2 | 1/2017 | Han et al. |
| 9,608,909 B1 | 3/2017 | Bharadwaj et al. |
| 9,672,028 B1 | 6/2017 | Vopni et al. |
| 9,679,286 B2 | 6/2017 | Colnot et al. |
| 9,830,141 B2 | 11/2017 | Cairns et al. |
| 9,916,737 B2 | 3/2018 | Osmon et al. |
| 9,934,014 B2 | 4/2018 | Diebolt et al. |
| 10,050,347 B2 | 8/2018 | Wei |
| 10,572,695 B1 | 2/2020 | Guise et al. |
| 10,579,989 B1 | 3/2020 | Binder et al. |
| 10,635,820 B1 | 4/2020 | Gallinghouse et al. |
| 2002/0091633 A1 | 7/2002 | Proctor |
| 2002/0153414 A1 | 10/2002 | Stoutenburg et al. |
| 2003/0076263 A1 | 4/2003 | Hassan-Zade et al. |
| 2003/0135418 A1 | 7/2003 | Shekhar et al. |
| 2003/0154414 A1 | 8/2003 | von Mueller et al. |
| 2003/0183691 A1 | 10/2003 | Lahteenmaki et al. |
| 2004/0012875 A1 | 1/2004 | Wood |
| 2004/0041911 A1 | 3/2004 | Odagiri et al. |
| 2004/0059682 A1 | 3/2004 | Hasumi et al. |
| 2004/0159699 A1 | 8/2004 | Nelson et al. |
| 2004/0167820 A1 | 8/2004 | Melick et al. |
| 2004/0204082 A1 | 10/2004 | Abeyta |
| 2005/0097015 A1 | 5/2005 | Wilkes et al. |
| 2005/0108444 A1 | 5/2005 | Flauaus et al. |
| 2005/0109841 A1 | 5/2005 | Ryan et al. |
| 2005/0236480 A1 | 10/2005 | Vrotsos et al. |
| 2006/0032905 A1 | 2/2006 | Bear et al. |
| 2006/0049255 A1 | 3/2006 | von Mueller et al. |
| 2006/0190611 A1 | 8/2006 | Miyazaki et al. |
| 2006/0223580 A1 | 10/2006 | Antonio et al. |
| 2007/0028120 A1 * | 2/2007 | Wysocki ............... H04L 63/061 713/192 |
| 2007/0051809 A1 | 3/2007 | Takahashi et al. |
| 2007/0067833 A1 | 3/2007 | Colnot |
| 2007/0121507 A1 | 5/2007 | Manzalini et al. |
| 2007/0168300 A1 | 7/2007 | Quesselaire et al. |
| 2007/0194104 A1 | 8/2007 | Fukuda et al. |
| 2007/0198436 A1 | 8/2007 | Weiss |
| 2008/0091617 A1 | 4/2008 | Hazel et al. |
| 2008/0204195 A1 | 8/2008 | Diorio et al. |
| 2009/0037284 A1 * | 2/2009 | Lewis .................. G06Q 20/202 705/16 |
| 2009/0070583 A1 | 3/2009 | von Mueller et al. |
| 2009/0112768 A1 | 4/2009 | Hammad et al. |
| 2009/0164326 A1 | 6/2009 | Bishop et al. |
| 2010/0057620 A1 | 3/2010 | Li et al. |
| 2010/0243732 A1 | 9/2010 | Wallner |
| 2011/0078435 A1 | 3/2011 | Krieger et al. |
| 2011/0110232 A1 | 5/2011 | Abraham et al. |
| 2011/0110381 A1 | 5/2011 | Atkinson et al. |
| 2012/0094599 A1 | 4/2012 | Takeyama |
| 2012/0257523 A1 | 10/2012 | Kastur et al. |
| 2013/0249740 A1 | 9/2013 | Shedletsky |
| 2013/0260680 A1 | 10/2013 | Tsai |
| 2013/0300453 A1 | 11/2013 | Carapelli et al. |
| 2013/0309966 A1 | 11/2013 | Aldana et al. |
| 2013/0343186 A1 | 12/2013 | Gnanasekaran et al. |
| 2014/0056147 A1 | 2/2014 | Gnanasekaran et al. |
| 2014/0086054 A1 | 3/2014 | Rongong et al. |
| 2014/0148095 A1 | 5/2014 | Smith et al. |
| 2014/0150056 A1 * | 5/2014 | Williams ................ G06F 21/36 726/2 |
| 2014/0173579 A1 | 6/2014 | McDonald |
| 2014/0208786 A1 | 7/2014 | Billman et al. |
| 2014/0273830 A1 | 9/2014 | Wong et al. |
| 2014/0317614 A1 | 10/2014 | Djabarov et al. |
| 2014/0375481 A1 | 12/2014 | McNicoll |
| 2015/0048163 A1 | 2/2015 | Senior |
| 2015/0052512 A1 | 2/2015 | Kostadinov et al. |
| 2015/0077361 A1 | 3/2015 | Seo et al. |
| 2015/0178064 A1 | 6/2015 | Cairns et al. |
| 2015/0230081 A1 * | 8/2015 | Choi-Grogan .......... H04L 67/34 455/419 |
| 2015/0235204 A1 | 8/2015 | Wallner |
| 2015/0303994 A1 | 10/2015 | Dhayni |
| 2015/0339649 A1 | 11/2015 | Pi Farias |
| 2016/0006123 A1 | 1/2016 | Li et al. |
| 2016/0028157 A1 | 1/2016 | Kim et al. |
| 2016/0054989 A1 | 2/2016 | Diebolt et al. |
| 2016/0079802 A1 | 3/2016 | Choi et al. |
| 2016/0111770 A1 | 4/2016 | Choi et al. |
| 2016/0182127 A1 | 6/2016 | Karandikar et al. |
| 2016/0218432 A1 | 7/2016 | Pope et al. |
| 2016/0275478 A1 | 9/2016 | Li et al. |
| 2016/0306616 A1 | 10/2016 | Fomppo |
| 2016/0308587 A1 | 10/2016 | Lee et al. |
| 2016/0323428 A1 | 11/2016 | Kim et al. |
| 2017/0323537 A1 | 11/2017 | Lim et al. |
| 2017/0357961 A1 | 12/2017 | Bidar et al. |
| 2018/0005224 A1 | 1/2018 | Binder et al. |

(56) References Cited

U.S. PATENT DOCUMENTS

| | | |
|---|---|---|
| 2018/0063004 A1 | 3/2018 | Uppunda et al. |
| 2018/0068300 A1 | 3/2018 | Saeed et al. |
| 2018/0198190 A1 | 7/2018 | Leem |
| 2019/0004785 A1 | 1/2019 | Kelley et al. |
| 2021/0065159 A1 | 3/2021 | Bidar et al. |

FOREIGN PATENT DOCUMENTS

| | | |
|---|---|---|
| CN | 1928885 A | 3/2007 |
| CN | 102468872 A | 5/2012 |
| CN | 202261429 U | 5/2012 |
| CN | 102709686 A | 10/2012 |
| CN | 103905073 A | 7/2014 |
| CN | 204009927 U | 12/2014 |
| CN | 105075143 A | 11/2015 |
| CN | 109314545 A | 2/2019 |
| CN | 109644021 A | 4/2019 |
| DE | 20320080 U1 | 4/2004 |
| EP | 0 895 203 A2 | 2/1999 |
| EP | 1260947 A1 | 11/2002 |
| EP | 1 874 014 A2 | 1/2008 |
| EP | 2736178 A1 | 5/2014 |
| FR | 2 812 744 A1 | 2/2002 |
| FR | 2 812 745 A1 | 2/2002 |
| FR | 2 834 156 A1 | 6/2003 |
| JP | H09231285 A | 9/1997 |
| JP | 2000-030146 A | 1/2000 |
| JP | 2000-276539 A | 10/2000 |
| JP | 2001-222595 A | 8/2001 |
| JP | 2002-074507 A | 3/2002 |
| JP | 2002-123771 A | 4/2002 |
| JP | 2002-279320 A | 9/2002 |
| JP | 2002-352166 A | 12/2002 |
| JP | 2002-358285 A | 12/2002 |
| JP | 2003-108777 A | 4/2003 |
| JP | 2003-281453 A | 10/2003 |
| JP | 2003-308438 A | 10/2003 |
| JP | 2004-054651 A | 2/2004 |
| JP | 2004-062733 A | 2/2004 |
| JP | 2004-078553 A | 3/2004 |
| JP | 2004-078662 A | 3/2004 |
| JP | 2004-199405 A | 7/2004 |
| JP | 4248820 B2 | 4/2009 |
| KR | 10-1999-0066397 A | 8/1999 |
| KR | 10-1999-0068618 A | 9/1999 |
| KR | 200225019 B1 | 3/2001 |
| KR | 10-2003-0005936 A | 1/2003 |
| KR | 10-2003-0005984 A | 1/2003 |
| KR | 10-2003-0012910 A | 2/2003 |
| KR | 200333809 B1 | 11/2003 |
| KR | 10-2004-0016548 A | 2/2004 |
| KR | 100447431 B1 | 8/2004 |
| KR | 200405877 B1 | 1/2006 |
| KR | 100649151 B1 | 11/2006 |
| KR | 10-2007-0107990 A | 11/2007 |
| KR | 100842484 B1 | 6/2008 |
| RU | 2284578 C1 | 9/2006 |
| TW | 201105089 A | 2/2011 |
| WO | 1998/012674 A2 | 3/1998 |
| WO | 2000/011624 A1 | 3/2000 |
| WO | 2000/025277 A1 | 5/2000 |
| WO | 2001/086599 A2 | 11/2001 |
| WO | 2002/033669 A1 | 4/2002 |
| WO | 2002/043020 A2 | 5/2002 |
| WO | 2002/082388 A1 | 10/2002 |
| WO | 2002/084548 A1 | 10/2002 |
| WO | 2003/044710 A1 | 5/2003 |
| WO | 2003/079259 A1 | 9/2003 |
| WO | 2004/023366 A1 | 3/2004 |
| WO | 2006/131708 A1 | 12/2006 |
| WO | 2017/214349 A1 | 12/2017 |
| WO | 2018/005468 A1 | 1/2018 |
| WO | 2019/005386 A1 | 1/2019 |

OTHER PUBLICATIONS

English Language Translation of Second Office Action received for Chinese Patent Application No. 201780035862, dated May 13, 2021.

Martha E. Haykin et al., "Smart Card Technology: New Methods for Computer Access Control," NIST Special Publication 500-157, Sep. 1988.

"MSP430x1xx Family User's Guide," (including 2016 correction sheet at 2), Texas Instruments Inc., 2006.

Negron, J., "[Technical Blueprint] Windows 10 Co-Management with SCCM & Workspace ONE," VMware End-User Computing Blog, dated Apr. 16, 2018, Retrieved from the Internet URL: http://aponewsletter.blogspot.com/2018/04/technical-blueprint-windows-10-co.html, pp. 1-9.

Spegele, Joseph Brain., "A Framework for Evaluating Application of Smart Cards and Related Technology Within the Department of Defense," Naval Postgraduate School, Jan. 1995.

Stephen A. Sherman et al., "Secure Network Access Using Multiple Applications of AT&T's Smart Card," AT&T Technical Journal, Sep./Oct. 1994.

"Software Update Server," Technology Brief, Retrieved from the Internet URL: https://www.apple.com/server/docs/Software_Update_Server_TB_v10.4.pdf, pp. 1-3 (Jun. 16, 2005).

Huth C. et al., "Secure Software Update and IP Protection for Untrusted Devices in the Internet of Things Via Physically Unclonable Functions", The First IEEE International Workshop on Security, (2016), pp. 1-6.

Gupta H. et al., "Onboarding and Software Update Architecture for IoT Devices", IEEE, (2019), pp. 1-11.

Non-Final Office Action dated Mar. 29, 2018, for U.S. Appl. No. 15/248,071, of Uppunda, K.K.K., et al., filed Aug. 26, 2016.

Non-Final Office Action dated Apr. 19, 2018, for U.S. Appl. No. 15/176,589, of Bidari, E., et al., filed Jun. 8, 2016.

Non-Final Office Action dated Jul. 25, 2018, for U.S. Appl. No. 15/636,356, of Kelley, J., et al., filed Jun. 28, 2017.

Final Office Action dated Oct. 25, 2018, for U.S. Appl. No. 15/176,589, of of Bidari, E., et al., filed Jun. 8, 2016.

Final Office Action dated Nov. 5, 2018, for U.S. Appl. No. 15/248,071, of Uppunda, K.K.K., et al., filed Aug. 26, 2016.

Final Office Action dated Jan. 4, 2019, for U.S. Appl. No. 15/636,356, of Kelley, J., et al., filed Jun. 28, 2017.

Final Office Action dated Sep. 2, 2020, for U.S. Appl. No. 15/636,356, of Kelley, J., et al., filed Jun. 28, 2017.

Advisory Action dated Jan. 7, 2019, for U.S. Appl. No. 15/176,589, of Bidari, E., et al., filed Jun. 8, 2016.

Notice of Allowance dated Jan. 18, 2019, for U.S. Appl. No. 15/197,720, of Binder, J., et al., filed Jun. 29, 2016.

Non-Final Office Action dated Mar. 14, 2019 for U.S. Appl. No. 15/636,356, of Kelley, J. filed Jun. 28, 2017.

Non-Final Office Action dated Mar. 25, 2019, for U.S. Appl. No. 15/248,071, of Uppunda, K.K.K., et al., filed Aug. 26, 2016.

Non-Final Office Action dated Apr. 19, 2019, for U.S. Appl. No. 15/428,071, of Guise M., et al., filed Feb. 8, 2017.

Non-Final Office Action dated Jun. 24, 2019, for U.S. Appl. No. 16/397,836, of Binder, J., et al., filed Apr. 29, 2019.

Non-Final Office Action dated Jun. 25, 2019, for U.S. Appl. No. 15/721,663, of Gallinghouse, D., et al., filed Sep. 29, 2017.

Non-Final Office Action dated Jun. 28, 2019, for U.S. Appl. No. 15/176,589, of Bidari, E., et al., filed Jun. 8, 2016.

Non-Final Office Action dated Jul. 15, 2019, for U.S. Appl. No. 15/636,356, of Kelley, J., et al., filed Jun. 28, 2017.

Notice of Allowance dated Oct. 22, 2019, for U.S. Appl. No. 15/428,071, of Guise M., et al., filed Feb. 8, 2017.

Notice of Allowance dated Oct. 10, 2019, for U.S. Appl. No. 16/397,836, of Binder, J., et al., filed Apr. 29, 2019.

Notice of Allowance dated Nov. 6, 2019, for U.S. Appl. No. 15/176,589, of Bidari, E., et al., filed Jun. 8, 2016.

Notice of Allowance dated Dec. 23, 2019, for U.S. Appl. No. 15/721,663, of Gallinghouse, D., et al., filed Sep. 29, 2017.

Final Office Action dated Jan. 3, 2020, for U.S. Appl. No. 15/636,356, of Kelley, J., et al., filed Jun. 28, 2017.

(56) References Cited

OTHER PUBLICATIONS

Advisory Action dated Mar. 16, 2020, for U.S. Appl. No. 15/636,356, of Kelley, J., et al., filed Jun. 28, 2017.
Non-Final Office Action dated Mar. 16, 2020, for U.S. Appl. No. 15/176,589, of Bidari, E., et al., filed Jun. 8, 2016.
Non-Final Office Action dated May 8, 2020, for U.S. Appl. No. 15/636,356, of Kelley, J., et al., filed Jun. 28, 2017.
Examination Report for European Patent Application No. 17739748.6, dated Jan. 16, 2020.
Intention to Grant received for European Patent Application No. 17737959.1, dated Jul. 4, 2019.
Intention to Grant received for European Patent Application No. 17737959.1, dated Nov. 6, 2019.
Decision to Grant received for European Patent Application No. 17737959.1, dated Nov. 21, 2019.
Office Action received for European Patent Application No. 17739748.6, dated Jul. 7, 2020.
Notice of Allowance dated Jul. 31, 2020, for U.S. Appl. No. 15/176,589, of Bidari, E., et al., filed Jun. 8, 2016.
Corrected Notice of Allowability dated Aug. 28, 2020, for U.S. Appl. No. 15/176,589, of Bidari, E., et al., filed Jun. 8, 2016.
Notice of Allowance dated Oct. 20, 2020, for U.S. Appl. No. 15/176,589, of Bidari, E., et al., filed Jun. 8, 2016.
Notice of Allowance dated Nov. 16, 2020, for U.S. Appl. No. 15/636,356, of Kelley, J., et al., filed Jun. 28, 2017.
Corrected Notice of Allowability dated Dec. 2, 2020, for U.S. Appl. No. 15/176,589, of Bidari, E., et al., filed Jun. 8, 2016.
Office Action received for Chinese Patent Application No. 201780035862, dated Dec. 2, 2020.
Office Action received for Chinese Patent Application No. 201780040833.2, dated Dec. 22, 2020.
International Search Report and Written Opinion for International Application No. PCT/US2016/050036, dated Nov. 29, 2016.
International Search Report and Written Opinion for International Application No. PCT/US2017/039466, dated Oct. 5, 2017.
International Search Report and Written Opinion for International Application No. PCT/US2017/036473, dated Oct. 13, 2017.
International Search Report and Written Opinion for International Application No. PCT/US2018/034773, dated Aug. 10, 2018.
Brinkmann, M., "Windows 10 Update Delivery Optimization explained," Windows, dated Aug. 17, 2016, Retrieved from the Internet URL: https://web.archive.org/web/20161110094241/https://www.ghacks.net/2016/08/17/windows-10-update-delivery-optimization/, pp. 1-6.
"Connection of Terminal Equipment to the Telephone Network," FCC 47 CFR Part 68, Retrieved from the URL: http://www.tscm.com/FCC47CFRpart68.pdf, on Sep. 24, 2019 Oct. 1, 1999 Edition.
"EMBEDDED FINancial transactional IC card READer," Retrieved from the URL: https://cordis.europa.eu/project/rcn/58338/factsheet/en.
"FLEX-M24LR04E 45 mm×75 mm flexible antenna reference board for the M24LR04E-R Dual Interface EEPROM," ST Microelectronics, published Jul. 2, 2012, Retrieved from the Internet URL : http://www.st.com/content/ccc/resource/technical/document/data_brief/2d/55/62/05/58/fd/42/e2/DM00058583.pdf/files/DM00058583.pdf/jcr:content/translations/en.DM00058583.pdf, on Sep. 26, 2017, pp. 1-3.
Geethapriya Venkataramani and Srividya Gopalan., "Mobile phone based RFID architecture for secure electronic payments using RFID credit cards," 2007 IEEE, (ARES'07).
"Guideline for the Use of Advanced Authentication Technology," FIPS 190, Sep. 28, 1994.
"Identification cards—Recording technique—Part 4—Location of read-only magnetic tracks—Track 1 and 2," ISO/IEC 7811-4:1995, International Organization for Standardization, Aug. 1995.
Jerome Svigals., "The Long Life and Imminent Death of the Mag-stripe Card," IEEE Spectrum, vol. 49, Issue 61, Jun. 2012.
"Magensa's Decryption Services and MagTek's MagneSafe™ Bluetooth Readers Selected by eProcessing Network to Implement Secure Customer Card Data with Mobile Devices," Retrieved from the URL: https://www.magnensa.net/aboutus/articles/eProcessing—rev1.pdf Apr. 14, 2008.
Office Action received for European Patent Application No. 17739748.6, dated May 10, 2021.
Notice to Grant received for Chinese Patent Application No. 201780040833.2, dated May 20, 2021.

\* cited by examiner

SECURELY UPDATING SOFTWARE ON CONNECTED ELECTRONIC DEVICES

RELATED APPLICATIONS

This application claims priority to and is a continuation of U.S. patent application Ser. No. 15/636,356, filed on Jun. 28, 2017, and issued as U.S. Pat. No. 10,949,189 on Mar. 16, 2021, the entire contents of which are incorporated herein by reference.

BACKGROUND

Merchants may conduct transactions for items and services with customers. During a transaction between a merchant and a customer, the merchant can use a point-of-sale (POS) device to input information associated with the transaction. For example, the merchant can input information describing items that the customer is acquiring from the merchant, respective prices of each of the items, and payment information of a payment instrument being used by the customer. The POS device can then send a request to a payment service to process the payment instrument for a price of the transaction.

In some instances, the POS device may be connected to a separate electronic device that customers can use to input payment information of payment instruments during transactions. For instance, a customer may input payment information into the electronic device, which can then send the payment information to the POS device for authorization. However, when a POS device is connected to such a separate electronic device, security problems can arise with regard to stealing of sensitive information, such as the payment information. For instance, software may be loaded on the POS device, such as when the POS device is updated, that steals the sensitive information.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
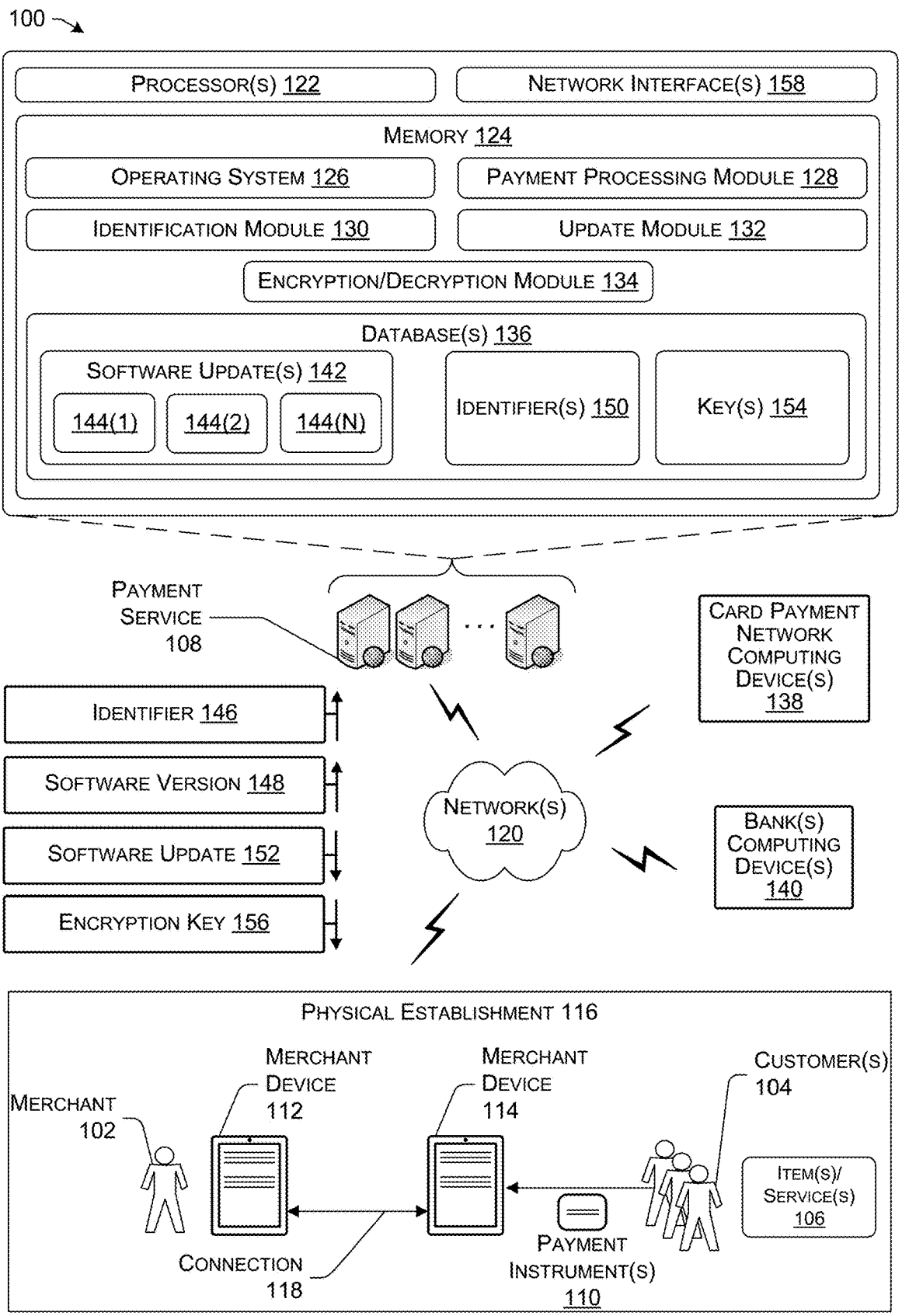
FIG. 1 illustrates an example of a payment service providing a merchant device with a software update.

This application describes, in part, techniques for securely updating a point-of-sale (POS) system that includes at least a merchant-facing device and a buyer-facing device. The POS system can include a merchant user interface (UI) presented on a merchant-facing display and a customer UI presented on a customer-facing display. In some instances, the merchant UI can be displayed on a display of a merchant device (also referred to as a first merchant device or the merchant-facing device), while the customer UI can be displayed on a display of a customer device (also referred to as a second merchant device or the customer-facing device). In such instances, the merchant device and the customer device can be operably connected via a wired connection (also referred to as a physical connection) and/or a wireless connection (also referred to as a network connection).

In some instances, the POS system may update software using a cloud-based system, such as a payment system. For instance, the merchant device may include first software that the merchant device executes during transactions with customers, where the first software provides the merchant device with at least first POS functionality, such as receiving information associated with the transactions. Additionally, the customer device may include second software that the customer device executes during the transactions with the customers, where the second software provides the customer device with at least second POS functionality, such as receiving payment information from the customers. Moreover, the customer device may include a secure enclave, such as a secure payments enclave, that includes third software that the customer device executes when conducting the transactions with the customers.

To securely update the software, the merchant device can communicate with the payment system via a network connection. For instance, the merchant device can send, via the network connection, the payment system both an identifier associated with the merchant device and an indication of a current version of the first software included (e.g., executing) on the merchant device. In response, the payment service can identify the merchant device using the identifier. For instance, the payment service can compare the identifier associated with the merchant device to a database of stored identifiers to identify the merchant device. The payment service can then determine, based on the indication of the current version of the first software, that the merchant device can update the first software.

For instance, the payment service may store a software update for POS systems. The software update can include an updated version of the first software, an updated version of the second software, and/or an updated version of the third software. When the payment service receives the indication of the current version of the first software from the merchant device, the payment service can compare the current version of the first software to the updated version of the first software within the software update to determine that the merchant device includes a previous version of the first software. Based on the determination, the payment service can send the merchant device the software update via the network connection. In some instances, the payment service sends the software update to the merchant device using hypertext transfer protocol (HTTP). In other instances, other types of techniques may be used.

The merchant device can receive the software update from the payment service and store the software update in response. In some instances, the merchant device stores the entire software update while in other instances, the merchant device stores only a portion of the software update (e.g., the updated version of the second software and/or the updated version of the third software). The merchant device can further use the updated version of the first software included in the software update to update the first software on the merchant device. In some instances, in response to updating the first software, the merchant device can reboot in order to apply the update to the merchant device.

After updating the first software, the merchant device can cause the customer device to update the second software stored on the customer device. For instance, the merchant device may detect, via a physical connection, a connection to the customer device. In response, the merchant device may send, via the physical connection, a message to the customer device that requests information associated with a current version of the second software included on the customer device. The customer device can receive the message from the merchant device and send, via the physical connection, the merchant device an indication of the current version of the second software. Using the indication, the merchant device can determine if the second software included on the customer device requires an update.

For instance, the merchant device can compare the current version of the second software to the updated version of the second software included in the stored software update to determine if the customer device includes a previous version of the second software or the updated version of the second software. In some instances, based on determining that the customer device includes the updated version of the second software, the merchant device can refrain from sending the customer device the software update. However, in some instances, based on determining that the customer device includes the previous version of the second software, the merchant device can send the customer device the software update via the physical connection, which causes the customer device to update the second software.

In some instances, before sending the customer device the software update, the merchant device first causes the customer device to reboot in an update mode. For instance, the merchant device can cut the power to the customer device via the physical connection. The merchant device can then cause the customer device to reboot in the update mode which, in some instances, can include causing the customer device to boot without loading the operating system of the customer device. While the customer device is in the update mode, the merchant device can send the software update to the customer device, which the customer device can use to update the second software. In some instances, updating the second software includes performing a flash update by overwriting the second software on the customer device with the updated version of the second software from the software update. After updating the second software, the customer device can reboot into a payments mode, which allows the customer device to once again receive payment information from customers.

In some instances, the customer device can then update the third software within the secure payments enclave. The third software can include software stored by one or more microcontrollers included in the secure payments enclave, such as firmware, system software, application software, or the like. Additionally, the third software can also include software being stored by a touch controller included in the secure payments enclave, such as firmware, system software, application software, or the like.

To update the third software, the customer device can compare a current version of the software included in the one or more microcontrollers to an updated version of the software included in the software update for the one or more microcontrollers. Based on the comparison, if the customer device determines that the current version of the software includes the updated version of the software from the software update, the customer device refrains from applying an update to the one or more microcontrollers. However, based on the comparison, if the customer device determines that the current version of the software includes a previous version of the software, the customer device updates the software included in the one or more microcontrollers using the software update.

For instance, the customer device can cause the secure payments enclave to enter an update mode of operation. In some instances, while in the update mode of operation, the secure payments enclave is only operable to receive updates from the customer device. The customer device can then update the software included in the one or more microcontrollers using the updated version of the software from the software update. In some instances, updating the software can include performing a flash update of the software on the one or more microcontrollers. After the update, the customer device can cause the secure payments enclave to once again enter a payments mode of operation in which the customer device can receive input from customers.

In some instances, the customer device can perform a similar process to update the software included in the touch controller. For instance, the customer device can compare a current version of the software included in the touch controller to an updated version of the software included in the software update for the touch controller. Based on the comparison, if the customer device determines that the current version of the software includes the updated version of the software from the software update, the customer device refrains from applying an update to the touch controller. However, based on the comparison, if the customer device determines that the current version of the software includes a previous version of the software, the customer device updates the software included in the touch controller using the software update.

For instance, the customer device can cause the secure payments enclave to enter an update mode of operation. As discussed above, in some instances, while in the update mode of operation, the secure payments enclave is only operable to receive updates from the customer device. The customer device can then update the software included in the touch controller using the updated version of the software from the software update. In some instances, updating the software can include performing a flash update of the software on the touch controller. After the update, the customer device can cause the secure payments enclave to once again enter a payments mode of operation in which the customer device can receive input from customers.

By performing the techniques described herein, the POS system is capable of securely updating software using the payment service. For instance, and as described herein, the software update received from the payment service may be encrypted using a software key, which is then encrypted using a device key that is associated with the merchant device. By receiving such an encrypted software update, the merchant device can ensure that the software update is from a secure payment service (e.g., not from an unsecure third-party system). Additionally, the merchant device and the customer device may perform a verification process (described below) in order to ensure that the customer device securely updated the second software on the customer device.

Additionally, by performing the techniques described herein, the POS system is capable of updating the customer device even when the customer device does not include a network connection to connect with the payment service (and/or does not include any type of wireless connection).

For instance, the first merchant device can receive, within the software update, the updated version of the second software for the customer device. The merchant device can then cause the customer device to update the second software via the physical connection between the merchant device and the customer device.

FIG. 1 illustrates an example environment 100 that includes a merchant 102 conducting transactions with customer(s) 104 for item(s)/service(s) 106, as well as a payment service 108 to authorize payment instrument(s) 110 of the customer(s) 104 for the transactions. For instance, the merchant 102 may input information associated with item(s)/service(s) 106 into the first merchant device 112, which can include the merchant-facing device. The customers 104 can then use a second merchant device 114, which can include the customer-facing device, to enter payment information associated with the payment instrument(s) 110. Based on receiving the payment information, the second merchant device 114 can encrypt the payment information, send the encrypted payment information to the first merchant device 112. The first merchant device 112 then sends the encrypted payment information to the payment service 108 for authorization.

As used in herein, a merchant device (e.g., the first merchant device 112, the second merchant device 114, or a merchant system which includes both the first merchant device 112 and the second merchant device 114) may comprise any sort of mobile or non-mobile devices (e.g., electronic device(s)) that include instances of application(s) that execute on the respective merchant device. The application(s) may provide POS functionality to the merchant devices to enable the merchant 102 (e.g., owners, employees, etc.) to at least accept payments from the customer(s) 104. In some types of businesses, the merchant devices may correspond to a store or other place of business of the merchant 102, and thus, may be a fixed location that typically does not change on a day-to-day basis. In other types of businesses, however, the location of the merchant devices may change from time to time, such as in the case that the merchant 102 operates a food truck, is a street vendor, is a cab driver, etc., or has an otherwise mobile business, e.g., in the case the merchant 102 sells items at buyer's homes, places of business, and so forth. In either of the examples above, the place of business of the merchant 102 may be referred to as a physical establishment 116.

Additionally, as used herein, a merchant 102 (also referred to as an "entity") may include any business engaged in the offering of items (e.g., goods) or services for acquisition by customer(s) 104. Actions attributed to a merchant 102 may include actions performed by owners, employees, or other agents of the merchant 102, and thus no distinction is made herein unless specifically discussed. In addition, as used herein, a customer 104 may include any entity that acquires items or services from a merchant 102, such as by purchasing, renting, leasing, borrowing, licensing, or the like. Hereinafter, items and/or services offered by merchants 102 may be referred to solely as items. Thus, a merchant 102 and a customer 104 may interact with each other to conduct a transaction in which the customer 104 acquires an item from a merchant 102, and in return, the customer 104 provides payment to the merchant 102.

As used herein, a transaction may include a financial transaction for the acquisition of items and/or services that is conducted between customer(s) 104 and the merchant 102. For example, when paying for a transaction, a customer 104 can provide the amount that is due to the merchant 102 using cash or other payment instrument 110 (e.g., a debit card, a credit card, a stored-value or gift card, a check, through an electronic payment application on a device carried by the customer 104, or the like). For instance, as discussed above, the customer 104 can interact with the second merchant device 114 to process the transaction, such as by inputting (e.g., manually, using a magnetic card reader or an RFID reader, etc.) identifiers (e.g., payment information, such as a card number, account number, or any other account information) associated with the payment instrument 110. For example, a payment instrument 110 of the customer 104 may include one or more magnetic strips for providing card and customer information when swiped in a card reader. In other examples, the payment instrument 110 may include other types of payment cards may be used, such as smart cards having a built-in memory chip that is read by the second merchant device 114 when the card is "dipped" into the reader, a radiofrequency identification tag, or so forth.

During a transaction between a merchant 102 and a customer 104, the merchant 102 may input transaction information describing the transaction into the first merchant device 112, such as an amount of payment received from the customer 104, the item(s)/service(s) 106 acquired by the customer 104, a time, place and date of the transaction, a card network associated with the payment instrument 110, an issuing bank of the payment instrument 110, a name of the customer 104, and so forth. The first merchant device 112 can then receive the payment information from the second merchant device 114 via a connection 118, which may be encrypted, and send the transaction information along with the payment information to the payment service 108 over a network 120, either substantially contemporaneously with the conducting of the transaction (in the case of online transactions) or later when the first merchant device 112 is in the online mode (in the case offline transactions).

The payment service 108 may include one or more processors 122 and memory 124, which may store an operating system 126, a payment processing module 128, an identification module 130, an update module 132, an encryption/decryption module 134, and databases(s) 136. The payment processing module 128 may function to receive the information regarding the transaction from the first merchant device 112 and attempt to authorize the payment instrument 110 used to conduct the transaction. The payment processing module 128 may then send an indication of whether the payment instrument 110 has been approved or declined back to the first merchant device 112.

Generally, when a customer 104 and a merchant 102 enter into an electronic payment transaction, the transaction is processed by electronically transferring funds from a financial account associated with the customer 104 to a financial account associated with the merchant 102. As such, the payment processing module 128 may communicate with one or more computing devices of a card network (or "card payment network") 138, e.g., MasterCard®, VISA®, over the network 120 to conduct financial transactions electronically. The payment processing module 128 can also communicate with one or more computing devices of one or more banks 140, processing/acquiring services, or the like over the network 120. For example, the payment processing module 128 may communicate with an acquiring bank, and/or an issuing bank, and/or a bank maintaining customer accounts for electronic payments.

An acquiring bank may be a registered member of a card association (e.g., Visa®, MasterCard®), and may be part of a card payment network. An issuing bank may issue payment instrument(s) 110 to customer(s) 104, and may pay acquiring banks for purchases made by customer(s) 104 to which the issuing bank has issued the payment instrument(s) 110. Accordingly, in some examples, the computing device(s) of an acquiring bank may be included in the card payment network and may communicate with the computing devices of a card-issuing bank to obtain payment. Further, in some examples, a customer 104 may use a debit card instead of a credit card, in which case, the bank computing device(s) of a bank corresponding to the debit card may receive communications regarding a transaction in which the customer 104 is participating. Additionally, there may be computing devices of other financial institutions involved in some types of transactions or in alternative system architectures, and thus, the foregoing are merely several examples for discussion purposes.

In the example environment 100 of FIG. 1, the payment service 108 can securely update both the first merchant device 112 and the second merchant device 114 by sending software update(s) 142 to the first merchant device 112 via the network(s) 120. As shown, software update(s) 142 can include various updated versions of software 144(1)-(N). For instance, a software update 142 can include an updated version of first software 144(1) stored on the first merchant device 112, an updated version of second software 144(2) stored on the second merchant device 114, and/or an updated version of third software 144(N) stored in a secure payments enclave within the second merchant device 114. In some instances, the first merchant device 112 can receive the software update 142 from the payment service 108 and cause each of the first software stored on the first merchant device 112, the second software stored on the second merchant device 114, and the third software stored in the secure payments enclave to be updated using the software update.

For instance, the first merchant device 112 can send, via the network(s) 120, the payment service 108 a message that includes an identifier associated with the first merchant device 112, which is represented by message 146. In some instances, the identifier can include a serial number, hardware identification, or any other identifier that the payment service 108 can use to identify the first merchant device 112. The first merchant device 112 can also send, via the network(s) 120, a message that indicates a current version of the first software being executed by the first merchant device 112, which is represented by message 148. The payment service 108 can then use the identifier and the indication of the current version of the first software to send the first merchant device 112 a software update 142.

For instance, the payment service 108 can utilize the identification module 130 to identify the first merchant device 112. In some instances, the identification module 130 identifies the first merchant device 112 by comparing the identifier received from the first merchant device 112 to a database of identifier(s) 150 that the payment service 108 stores for various merchant devices (e.g., other first merchant devices associated with other merchants). In some instances, each of the identifier(s) 150 within the database may be associated with a respective merchant device, and may identify the respective merchant device by serial number, hardware identification, or the like. As such, the identification module 130 can match the identifier received from the first merchant device 112 to one of the identifier(s) 150 stored in the database to identify the first merchant device 112.

The payment service 108 may then utilize the update module 132 to determine whether there is an update available for the first merchant device 112. For instance, the update module 132 may compare the current version of the first software executing on the first merchant device 112 to the latest version of the first software that the payment service 108 has stored within the software update(s) 142. In some instances, a version of software can include a unique version name, a unique version number, or other indicator that indicates a unique state of the software. As such, the update module 132 can compare the current version of the first software, which may include a first version name and/or first version number, to the most recent version of the first software from the software update(s) 142, which can include a second version name and/or second version number, to determine if the current version of the first software includes the most recent version of the first software.

For example, the current version of the first software may indicate that the first merchant device 112 is executing version 1.1 of the first software. The payment service 108 may store a software update 142 that includes version 1.2 of the first software. The update module 132 can thus compare the current version of the first software executing on the first merchant device 112 to the updated version of the first software within the software update 142 to determine that the first merchant device 112 can update the first software to version 1.2.

Based on determining that the first merchant device 112 can update the first software, the payment service 108 can send a message that includes the software update 142 to the first merchant device 112 via the network(s) 120, which is represented by message 152. In some instances, the payment service 108 sends the software update 142 to the first merchant device 112 using HTTP. In other instances, the payment service 108 can send the first update 142 to the first merchant device 112 using some other type of communications protocol.

In some instances, the payment service 108 first utilizes the encryption/decryption module 134 to encrypt the software update 142 before sending. For instance, the payment service 108 may store key(s) 154 (e.g., encryption keys), where a respective one of the key(s) 154 includes a device key 154 associated with a respective merchant device. As such, using the identity of the first merchant device 112, the encryption/decryption module 134 can retrieve the device key 154 associated with the first merchant device 112.

The encryption/decryption module 134 can then encrypt the software update using a software key 154 in order to generated an encrypted software update 142. In some instances, the software key 154 includes a generic key that the payment service 108 uses to encrypt the software update 142 before sending the software update 142 to any merchant device. The payment service 108 can then encrypt the software key 154 using the device key 154 associated with the first merchant device 112 to generate an encrypted software key 154. The payment service 108 can then send, via the network(s) 120, the encrypted software key 154 along with the encrypted software update 142 to the first merchant device 112, which is represented by message 156.

Figure 2:
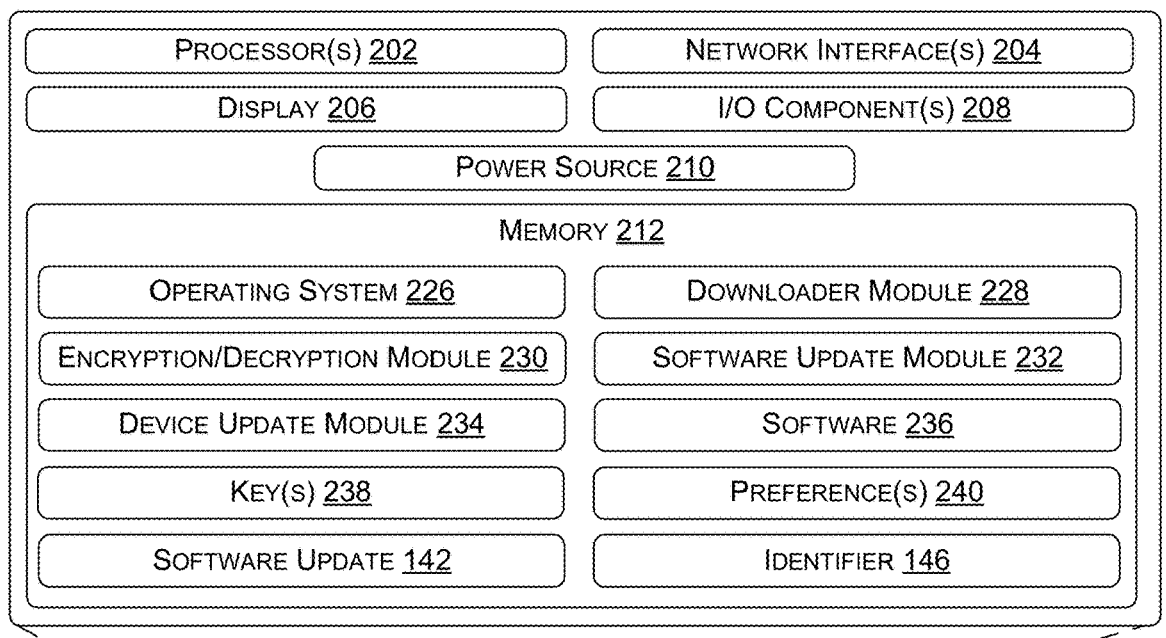
FIG. 2 illustrates an example of a first merchant device providing a second merchant device with the software update from the payment service.
Figure 2:
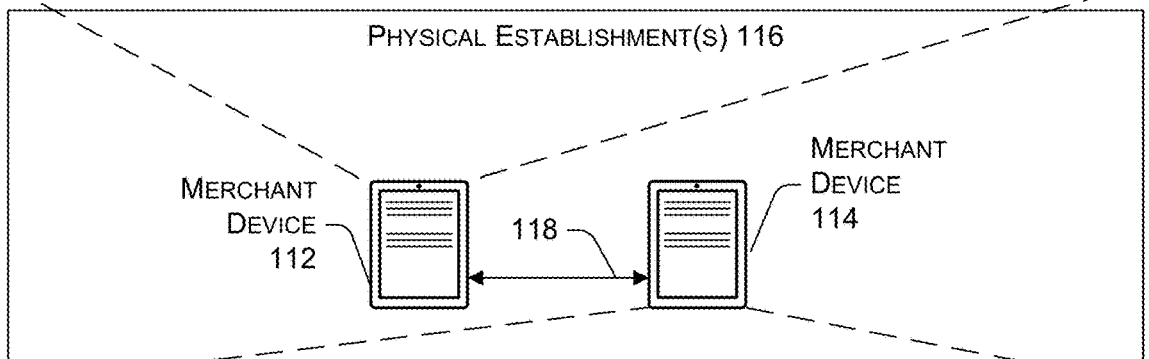
Figure 2:
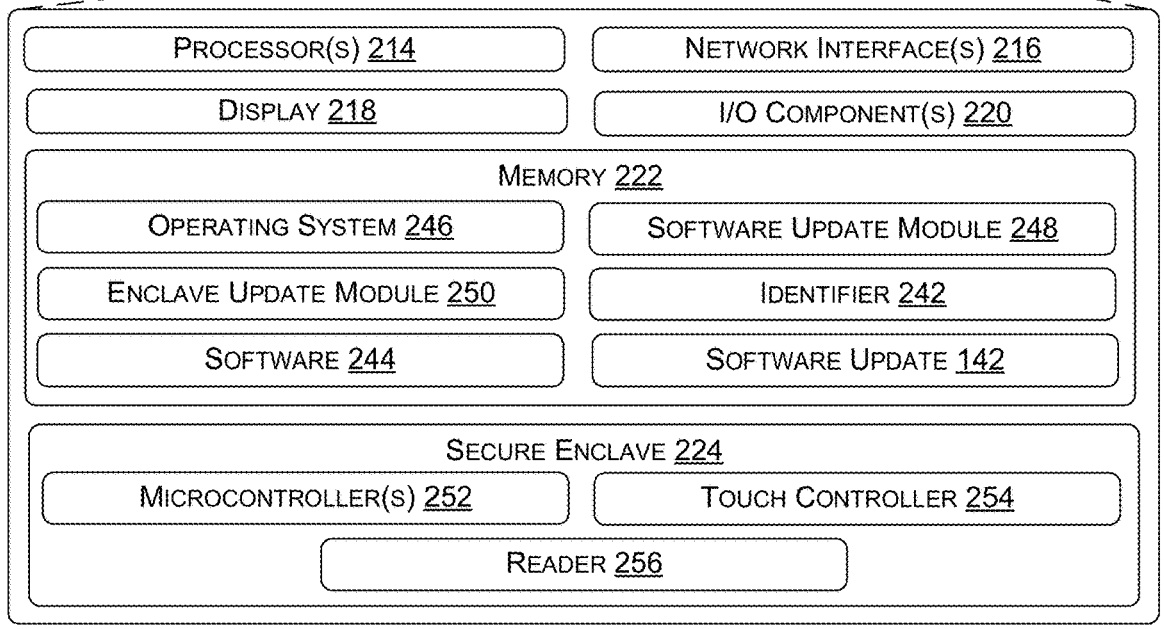

FIG. 2 illustrates an example environment 200 of the merchant system (i.e., the first merchant device 112 and the second merchant device 114) updating software using the software update 142 received from the payment service 108. As shown, the first merchant device includes processor(s) 202, network interface(s) 204, a display 206, input/output (I/O) component(s) 208, a power source 210, and a memory 212. Additionally, the second merchant device 114 includes processor(s) 214, network interface(s) 216, a display 218, I/O component(s) 220, memory 222, and a secure enclave 224.

As discussed herein, processor(s) (e.g., processor(s) 122, processor(s) 202, processor(s) 214, etc.), may comprise one or more processors or processing cores. For example, the processor(s) can be implemented as one or more microprocessors, microcomputers, microcontrollers, digital signal processors, central processing units, state machines, logic circuitries, and/or any devices that manipulate signals based on operational instructions. In some cases, the processor(s) may be one or more hardware processors and/or logic circuits of any suitable type specifically programmed or configured to execute the algorithms and processes described herein. The processor(s) can be configured to fetch and execute computer-readable processor-executable instructions stored in the memory.

Additionally, as discussed herein, memory (e.g., memory 124, memory 212, memory 222, etc.) may be an example of tangible non-transitory computer storage media and may include volatile and nonvolatile memory and/or removable and non-removable media implemented in any type of technology for storage of information such as computer-readable processor-executable instructions, data structures, program modules or other data. The memory may include, but is not limited to, RAM, ROM, EEPROM, flash memory, solid-state storage, magnetic disk storage, optical storage, and/or other computer-readable media technology. Further, in some cases, devices, such as merchant device(s), the payment service 108, a customer device, or the like, can access external storage, such as RAID storage systems, storage arrays, network attached storage, storage area networks, cloud storage, or any other medium that can be used to store information and that can be accessed by the processor(s) directly or through another computing device or network. Accordingly, the memory may be computer storage media able to store instructions, modules or components that may be executed by the processor(s). Further, when mentioned, non-transitory computer-readable media exclude media such as energy, carrier signals, electromagnetic waves, and signals per se To facilitate communication via communications channels, communication interface(s) (e.g. network interface(s) 158, network interface(s) 204, network interface(s) 216, etc.) can facilitate communications within a wide variety of networks and protocol types. Such networks and protocol types can include wired networks (e.g., Ethernet, DOCSIS, DSL, Fiber, universal serial bus (USB), etc.), which may also be referred to as physical connections, and wireless networks (e.g., WLAN, GSM, CDMA, 802.11, Bluetooth, Wireless USB, cellular, satellite, the Internet, etc.), which may also be referred to as network connections. In some instances, communication interface(s) 216 of the second merchant device 114 may only be include one or more of the wired networks. For instance, the first merchant device 112 and the second merchant device 114 may communicate via a physical connection, such as through a USB connection.

The I/O interface 208 and the I/O interface 220 can include peripheral input devices, such as a keyboard, a mouse, a pen, a game controller, a voice input device, a touch input device, a gestural input device, or any other device capable of receiving input. The input may include input events, e.g., a merchant or a customer touching or simulating a touch by placing a finger in proximity to a respective display (e.g., a presence-sensitive display), or by using a keyboard or other input mechanism. In various examples, the input may comprise a series of input events related to processing transactions via the first software and the second software, such as processing payment for goods and/or services.

The memory 212 of the first merchant device 112 includes an operating system 226, a downloader module 228, an encryption/decryption module 230, a software update module 232, a device update module 234, first software 236, key(s) 238 (e.g., encryption keys), preference(s) 240, the software update 142, and the identifier 146. The first merchant device 112 can utilize the downloader module 228 to receive the software update 142 from the payment service 108. For instance, as described in detail with regard to FIG. 1, the downloader module 228 can cause the first merchant device 112 to send both the identifier 146 associated with the first merchant device 112 and an indication of the current version of the first software 236 to the payment service 108. The downloader module 228 can further cause the first merchant device 112 to download the software update 142 from the payment service 108 when the payment service 108 includes an update for the first software 236. Additionally, in instances where the software update 142 is encrypted by the payment service 108, the downloader module 228 can cause the first merchant device 112 to download the encrypted software key 154 (which can be represented as one of the key(s) 238) for the updated software 140.

After receiving the software update 142, in instances where the software update 142 is encrypted, the first merchant device 112 can utilize the encryption/decryption module 230 to decrypt the software update 142. For instance, the encryption/decryption module 230 can retrieve the encrypted software key 238 sent from the payment service 108 along with the encrypted software update 142. The encryption/decryption module 230 can then use a local version of the device key 238, which can be similar to the device key 154 used by the payment service 108 to encrypt the encrypted software key 238, to decrypt the encrypted software key 238. After decrypting the software key 238, the encryption/decryption module 230 can decrypt the software update 142 using the software key 238.

The first merchant device 112 can then utilize the software update module 232 to update the first software 236 on the first merchant device 112. As described herein, the first software 236 can include any type of software that can be updated on the first merchant device 112, such as firmware, system software, application software, or the like. To update the first software 236, the software update module 232 can retrieve the updated version of the first software from the software update 142 and update the first software 236 using the updated version. After updating the first software 236, the first merchant device 112 can reboot to finish the updating process.

As discussed above, the first merchant device 112 can further cause the second merchant device 114 to update second software 244 stored on the second merchant device 114. As described herein, the second software 244 can include any type of software that can be updated on the second merchant device 114, such as firmware, system software, application software, or the like. To cause the second merchant device 114 to update the second software 244, the first merchant device 112 can utilize the device update module 234 to send a message to the second merchant device 114 that requests a current version of the second software 244 stored on the second merchant device 114 via the connection 118. In some instances, the device update module 234 sends the message in response to detecting the connection 118 with the second merchant device 114. For example, the device update module 234 may send the message, after the first merchant device 112 reboots, when the second merchant device 114 is already connected to the first merchant device 112. For another example, the device update module 234 may send the message in response to the second merchant device 114 being connected to the first merchant device 112 after the reboot.

The first merchant device 112 can then receive, via the connection 118, a message from the second merchant device 114 that includes an identifier 242 associated with the second merchant device 114 (e.g., a serial number, hardware identification, or any other identifier that the first merchant device 112 can use to identify the second merchant device 114) and an indication the current version of the second software 244 that is stored on the second merchant device 114. Based on receiving the message, the device update module 234 can use a similar technique as described above with regard to the update module 132 to determine if the second merchant device 114 includes a previous version of the second software 244.

For instance, the device update module 234 can compare the current version of the second software 244 stored on the second merchant device 114, which may include a first version name and/or first version number, to the updated version of the second software 244 from the software update 142, which can include a second version name and/or second version number. Based on the comparison, the device update module 234 can determine if the current version of the second software 244 stored on the second merchant device 114 should be (and/or is required to be) updated.

For instance, if the device update module 234 determines that the second merchant device 114 already includes the updated version of the second software 244 (e.g., the first version name and/or first version number matches the second version name and/or second version number), then the device update module 234 can refrain from sending the software update 142 to the second merchant device 114. However, if the device update module 234 determines that the second merchant device 114 includes a previous version of the second software 244 (e.g., the first version name and/or first version number matches the second version name and/or second version number), then the device update module 234 can determine to update the second merchant device 114.

To update the second merchant device 114, the device update module 234 can cause the second merchant device 114 to switch from a first mode of operation (e.g., a payments mode) in which the second merchant device 114 operates when conducting transactions with customers, to a second mode of operation (e.g., an emergency download mode, also referred to as an update mode) for updating the second merchant device 114. In some instances, the second merchant device 114 enters the second mode of operation by not booting the operating system 246 during the booting process. In some instances, the device update module 234 causes the second merchant device 114 to switch to the second mode of operation by rebooting the second merchant device 114. For instance, the device update module 234 can cut the power to the second merchant device 114, send a signal to the second merchant device 114 to enter the second mode of operation, and then turn the power back on to the second merchant device 114. The device update module 234 then sends the software update 142, and/or a portion of the software update 142, such as second version of the second software 244 and/or the third version of the third software, to the second merchant device 114.

For example, as discussed above, in some instances, the connection 118 can include a USB connection between the first merchant device 112 and the second merchant device 114. In such instances, the device update module 234 can cut the power to the second merchant device 114, turn on a pin of the USB connection that causes the second merchant device 114 to enter the second mode of operation, and then turn the power back on. In response, the second merchant device 114 can reboot in the second mode of operation. For instance, in the second mode of operation, the second merchant device 114 may not boot the operating system 246 on the second merchant device 114, but enter an emergency download mode. Based on the second merchant device 114 operating in the emergency download mode, the device update module 232 then sends the software update 142 to the second merchant device 114.

As shown, the memory 222 of the second merchant device 114 includes the operating system 246, a software update module 248, an enclave update module 250, the identifier 242, the second software 244, and the software update 142. The second merchant device 114 can utilize the software update module 248 to update the second software 244 on the second merchant device 114. To update the second software 244, the software update module 248 can retrieve the updated version of the second software from the software update 142 and update the second software 244 using the updated version. After updating the second software 244, the second merchant device 114 can reboot to finish the updating process. For instance, the second merchant device 114 can reboot back into the first mode of operation.

In some instances, updating of the second software 244 on the second merchant device 114 includes a flash update of the second software 244 on the second merchant device 114. For instance, the second merchant device 114 can overwrite the second software 244 on the second merchant device 114 with the updated version of the second software 244 from the software update 142. In some instances, the first merchant device 112 causes the flash update by sending the software update 142 to the second merchant device 114 via the connection 118.

In some instances, the first merchant device 112 and/or the second merchant device 114 can utilize one or more verification techniques to verify that the second merchant device 114 was securely updated. For instance, the second merchant device 114 can generate a hash and/or a table of hashes that are based on the software update 142 that the first merchant device 112 sends to the second merchant device 114, and then send the hash and/or the table of hashes to the first merchant device 112. In response, the first merchant device 112 can check the hash and/or the table of hashes to verify that only data that the first merchant device 112 sent to the second merchant 114 is what the second merchant device 114 received and used to update the second software 244. For instance, the first merchant device 112 can compare the hash and/or table of hashes to the software update 142 stored on the first merchant device 112.

In some instances, the second merchant device 114 can utilize the enclave update module 250 to update software in the secure enclave 224. For instance, upon reboot of the second merchant device 114, the enclave update module 250 can check current versions of third software stored within the secure enclave 224. In some instance, the third software can include both software being executed by the microcontroller(s) 252, which can include firmware, system software, application software, or the like. The third software can also include software being executed by the touch controller 254, which can include firmware, system software, application software, or the like. The enclave update module 250 can then update the software stored on the microcontroller(s) 252 when the software does not include an updated version of the software from the software update 142, and/or the enclave update module 250 can update software stored on touch controller 254 when the software does not include an updated version of the software from the software update 142.

For instance, the enclave update module 250 can compare a current version of the software stored on the microcontroller(s) 252, which can include a first version name, a first version number, or the like, to an updated version of software within the software update 142 for the microcontroller(s) 252, which can include a second version name, second version number, or the like. Based on the comparison, if the enclave update module 250 determines that the current version of the software matches the updated version of the software, such that the first version name, the first version number, or the like matches the second version name, the second version number or the like, then the enclave update module 250 refrains from applying an update to the microcontroller(s) 252. However, based on the comparison, if the enclave update module 250 determines that the current version of the software does not match the updated version of the software, such that the first version name, the first version number, or the like does not match the second version name, the second version number or the like, then the enclave update module 250 updates the software stored on the microcontroller(s) 252 using the software update 142.

For instance, the enclave update module 250 can cause the secure enclave 224 to enter an update mode of operation. In some instances, while in the secure mode of operation, the secure enclave 224 is only operable to receive updates from the enclave update module 250. The enclave update module 250 can then update the software stored on the microcontroller(s) 252 using the updated version of the software for the microcontroller(s) 252. In some instances, updating the software can include performing a flash update of the software on the microcontroller(s) 252. For instance, the enclave update module 250 can overwrite the software on the microcontroller(s) 252 with the updated version of the software from the software update 142. After the update, the secure enclave 224 can one again enter a payments mode in which the second merchant device 114 can receive input, such as customers.

In some instances, when the secure enclave 224 includes more than one microcontroller 252, the enclave update module 250 can send the software update to one of the microcontrollers 252, which then can pass the update to the one or more other microcontrollers 252. In such instances, each of the microcontrollers 252 can then be updated by performing a flash update using the updated version of the software from the software update 142.

Additionally, the enclave update module 250 can compare a current version of the software stored on the touch controller 254, which can include a first version name, a first version number, or the like, to an updated version of software within the software update 142 for the touch controller 254, which can include a second version name, second version number, or the like. Based on the comparison, if the enclave update module 250 determines that the current version of the software matches the updated version of the software, such that the first version name, the first version number, or the like matches the second version name, the second version number or the like, then the enclave update module 250 refrains from applying an update to the touch controller 254. However, based on the comparison, if the enclave update module 250 determines that the current version of the software does not match the updated version of the software, such that the first version name, the first version number, or the like does not match the second version name, the second version number or the like, then the enclave update module 250 updates the software stored on the touch controller 254 using the software update 142.

For instance, the enclave update module 250 can cause the secure enclave 224 to enter an update mode of operation. As discussed above, in some instances, while in the secure mode of operation, the secure enclave 224 is only operable to receive updates from the enclave update module 250. The enclave update module 250 can then update the software stored on the touch controller 254 using the updated version of the software for the touch controller 254. In some instances, updating the software can include performing a flash update of the software on the touch controller 254. For instance, the enclave update module 250 can overwrite the software on the touch controller 254 using the updated version of the software from the software update 142. After the update, the secure enclave 224 can one again enter a payments mode in which the second merchant device 114 can receive input, such as customers.

In some instances, the enclave update module 250 updates the touch controller 254 while the second merchant device 114 is rebooting. In some instances, the enclave update module 250 updates the touch controller 254 right after the second merchant device 114 finishes booting up. Still, in some instances, the enclave update module 250 updates the touch controller contemporaneously with the updating of the microcontroller(s) 252.

As also illustrated in FIG. 2, the first merchant device 112 further stores preference(s) 240 in the memory 212. In some instances, the first merchant device 112 can send the preference(s) 240 to the second merchant device 114 each time the second merchant device 114 is connected to the first merchant device 112 and/or each time the second merchant device 114 is updated. For instance, the first merchant device 112 can determine, via the physical connection 118, that the second merchant device 114 rebooted into the payments mode after updating the second software 244. The first merchant device 112 can then send, via the physical connection 118, data associated with the preference(s) 140 to the second merchant device 114 in response. The preference(s) 240 can include an identifier (e.g., name, logo, etc.) for the merchant, a background image that the second merchant device will display to customers, or the like.

Furthermore, the secure enclave 224 of the second merchant device 114 includes a reader 256. In some instances, the reader 256 may include an EMV slot that can read payment information from a memory chip in a payment card. In some instances, the reader 256 can include an NFC antenna for reading payment information from an electronic device. Still, in other instances, the reader 256 may include a read head for reading a magnetic strip of a payment card. In either of the instances above, the reader 256 may include encryption technology for encrypting the information read from the magnetic strip. Before sending the information to the first merchant device 112.

As described herein, a display (e.g., the display 206, the display 218, etc.) may employ any suitable display technology. For example, the display may be a liquid crystal display, a plasma display, a light emitting diode display, an OLED (organic light-emitting diode) display, an electronic paper display, or any other suitable type of display able to present digital content thereon. In some examples, the display may have a touch sensor associated with the display to provide a touchscreen display configured to receive touch inputs for enabling interaction with a graphic interface presented on the display. Accordingly, implementations herein are not limited to any particular display technology.

It should be noted that, in some instances, the first merchant device 112 can use the same processes described above with one or more other merchant devices that are similar to the second merchant device 114 (i.e., other buyer-facing devices). For instance, the first merchant device may detect a connection with a third merchant device via the physical connection, receive a current version of the second software stored on the third merchant device, and determine whether to cause an update to the second software. In some instances, if the first merchant device 112 determines that the current version of the second software includes the updated version of the second software from the software update, then the first merchant device 112 refrains from updating the third electronic device. However, in some instances, if the first merchant device 112 determines that the current version of the second software includes a previous version of the second software, then the first merchant device 112 can cause the third merchant device to update the second software.

Figure 3A:
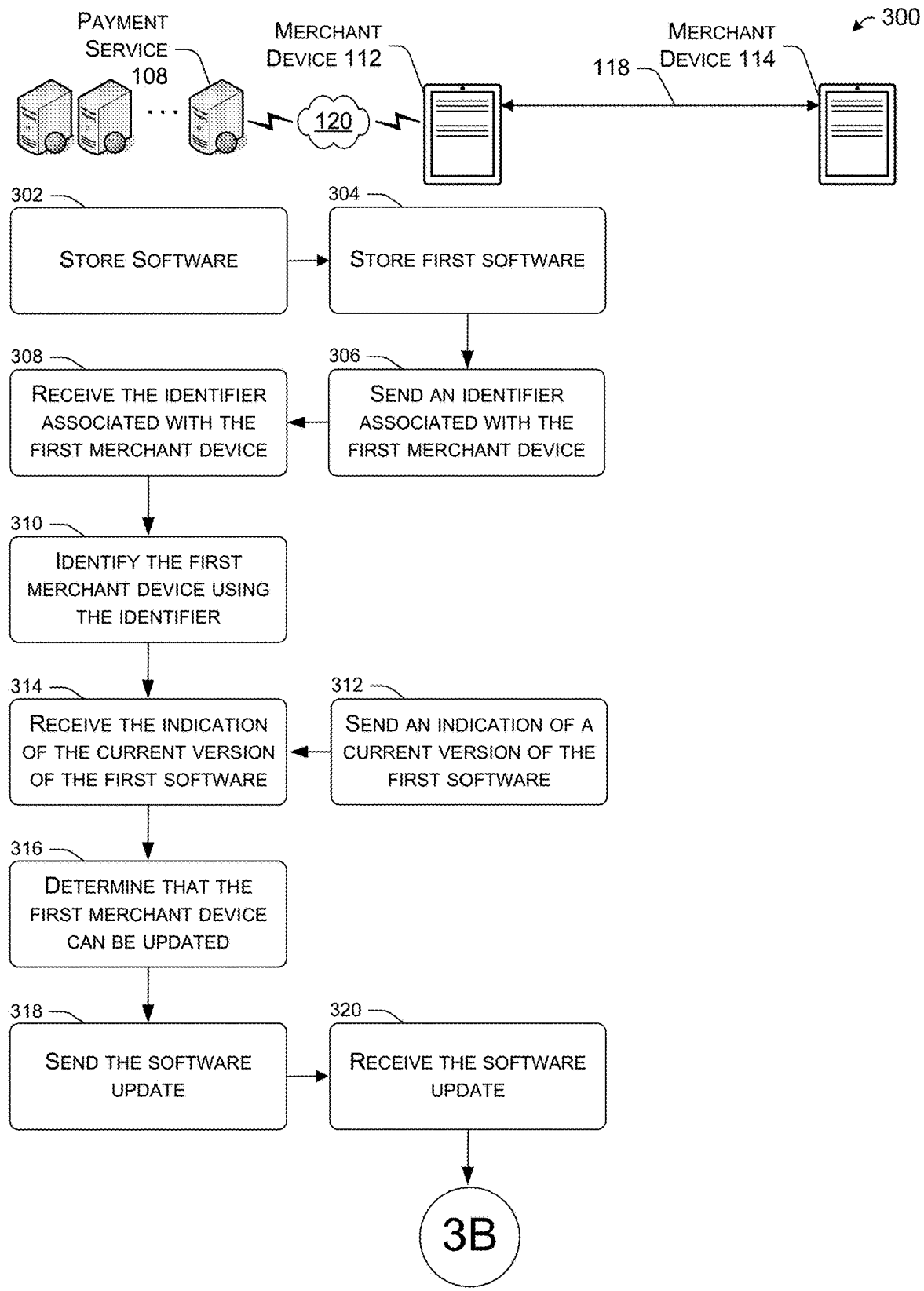
FIGS. 3A-3C illustrate a flow diagram of an example process for securely updating merchant devices using a software update sent from a payment service to one of the merchant devices.
Figure 3B:
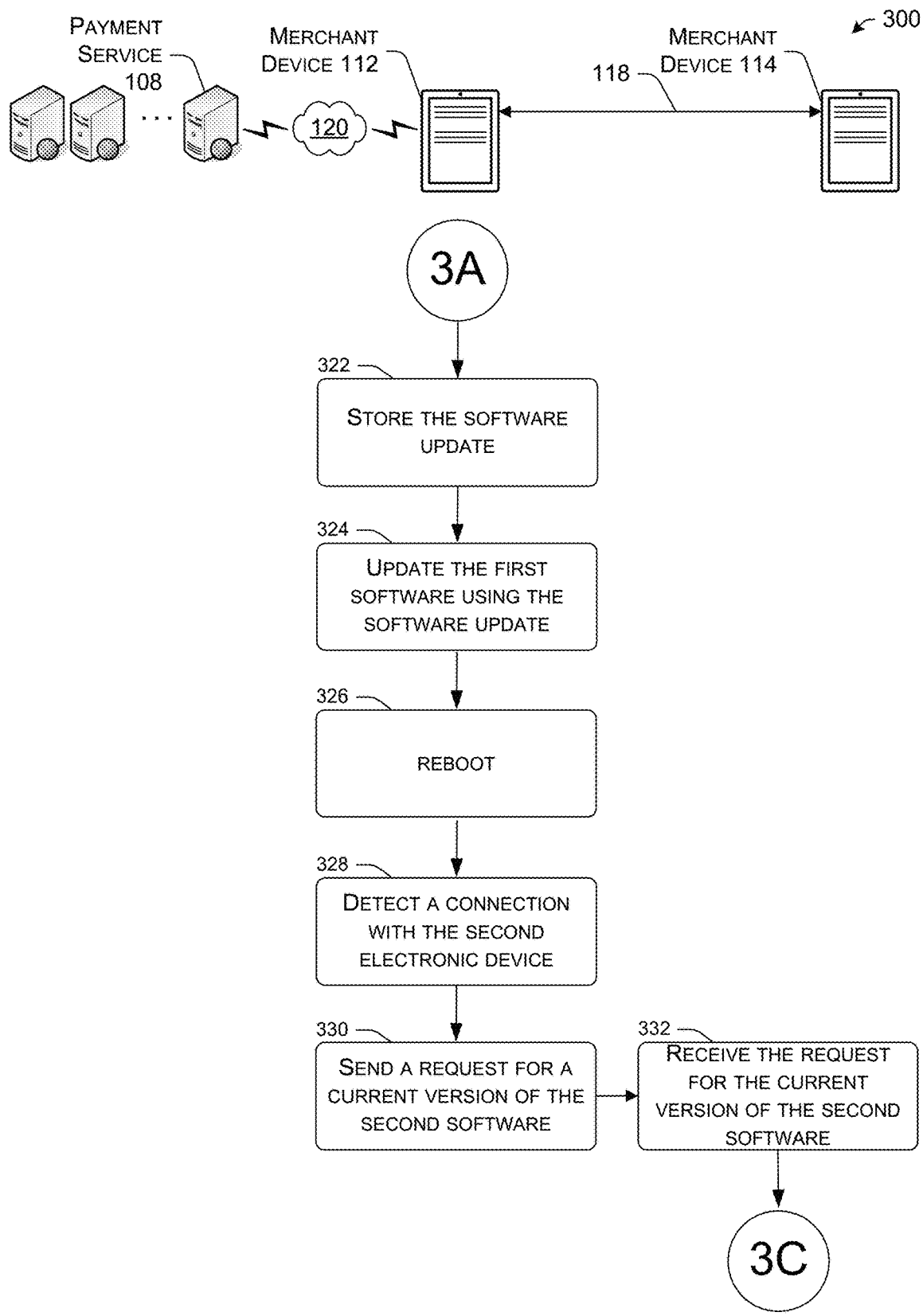
Figure 3C:
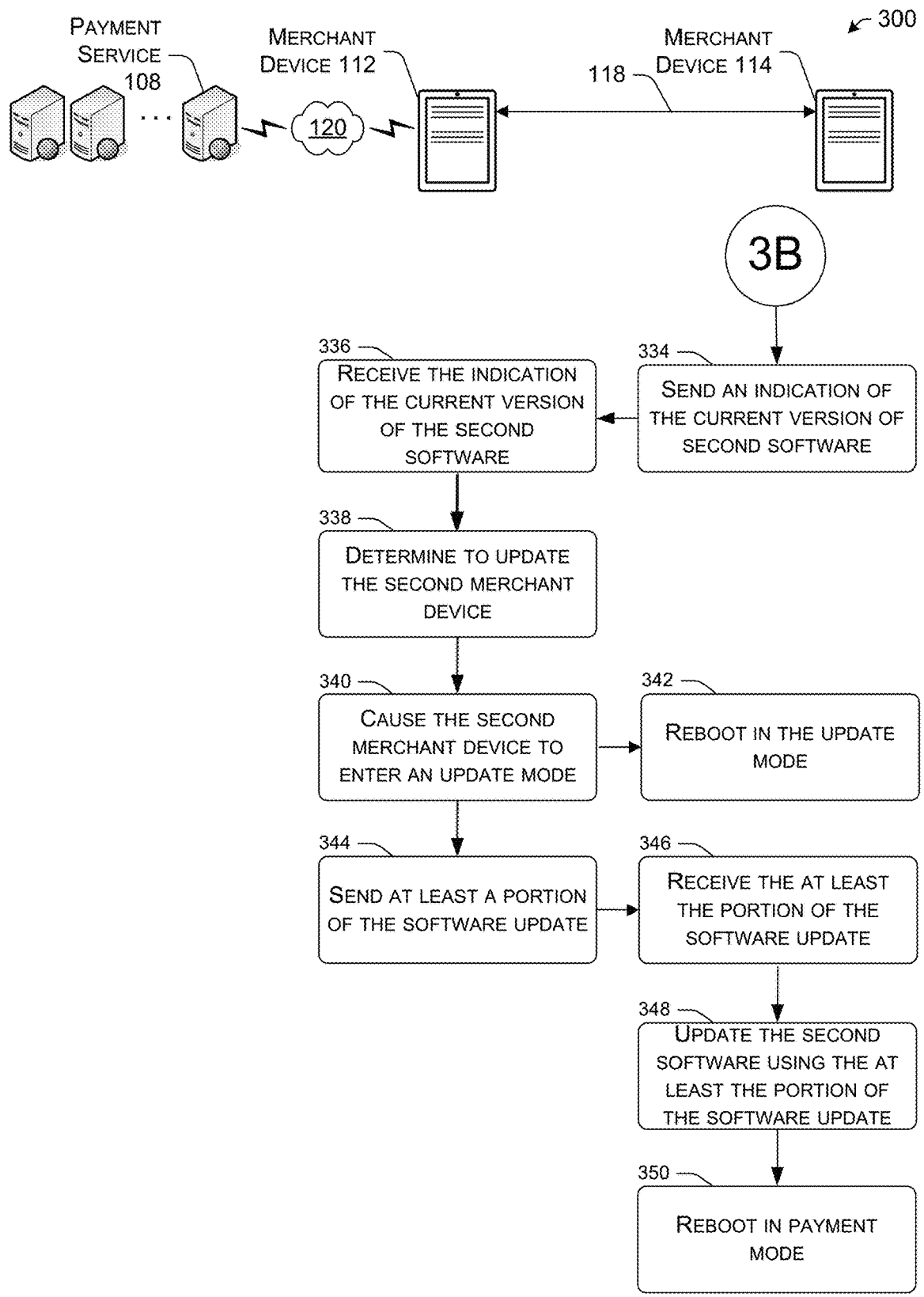

FIGS. 3A-3C illustrate a flow diagram of an example process 300 for securely updating merchant devices using a software update sent from a payment service to one of the merchant devices. The process 300, and other processes described herein, are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, architectures and systems described in the examples herein, although the processes may be implemented in a wide variety of other environments, architectures and systems. The process 300, and other processes described herein, may be performed by a payment service, one or more merchant devices, an additional electronic device, or by a combination thereof.

At 302, a payment service 108 stores a software update. For instance, the payment service 108 may store a software update for merchant systems, where a merchant system includes at least a first merchant device 112 (e.g., a merchant-facing device) and a second merchant device 114 (e.g., a customer-facing device). The software update can thus include an update for first software executing on the first merchant device 112, an update for second software executing on the second merchant device 114, and/or an update for third software executing within a secure enclave of the second merchant device 114.

At 304, the first merchant device stores first software. For instance, the first merchant device 112 may include the merchant-facing device and execute first software that provides the first merchant device 112 with POS functionality. In some instances, the POS functionality can allow the first merchant device 112 to receive information from a merchant during a transaction between the merchant and a customer. For instance, the merchant can input information indicating at least one or more items being purchased by the customer and a cost associated with the one or more items.

At 306, the first merchant device 112 sends an identifier associated with the first merchant device 112 to the payment service 108. For instance, the first merchant device 112 can send the payment service 108 an identifier, such as a serial number, hardware identification, or the like. In some instances, the first merchant device 112 sends the identifier to the payment service 108 via network(s) 120.

At 308, the payment service 108 receives the identifier associated with the first merchant device 112 and at 310, the payment service 108 identifies the first merchant device 112 using the identifier. For instance, the payment service may store a database of identifiers associated merchant devices. The payment service 108 can thus search the database using the identifier associated with the first merchant device 112 to identify the first merchant device 112. For instance, the payment service 108 can match the identifier associated with the first merchant device 112 with one of the identifiers within the database.

At 312, the first merchant device 112 sends an indication of a current version of the first software to the payment service 108 and at 314, the payment service 108 receives the indication of the current version of the first software from the first merchant device 112. In some instances, the first merchant device 112 may send the indication based on receiving a message requesting the current version of the first software from the payment service 108. In some instance, the first merchant device 112 may send the indication based on the first merchant device 112 connecting to the payment service 108 via the network(s) 120. Still, in some instances, the first merchant device 112 may send the indication based on a lapse of a set time period. For instance, the first merchant device 112 may send an indication of the current version of the first software every day, week, month, or the like.

At 316, the payment service 108 determines that the first merchant device 112 can be updated. For instance, the payment service 108 can compare the current version of the first software executing on the first merchant device 112 to the updated version of the first software from the software update. Based on the comparison, the payment service 108 can determine that the first merchant device 112 is executing a previous version of the first software (i.e., a version before the updated version of the first software). In response, the payment service 108 can determine that the first merchant device 112 can be updated.

At 318, the payment service 108 sends the software update to the first merchant device 112 and at 320, the first merchant device 112 receives the software update from the payment service 108. For instance, based on determining that the first merchant device 112 can be updated, the payment service 108 can send, via the network(s) 120, the software update to the first merchant device 112. In some instances, the first merchant device 112 first sends the payment service 108 a message requesting the software update before the payment service 108 sends the first merchant device 112 the software update. In some instances, the payment service 108 sends an encrypted version of the software update along with a software key for decrypting the software update. In such instances, the software key can be encrypted with a device key that is associated with the first merchant device 112.

At 322, the first merchant device 112 stores the software update and at 324, the first merchant device 112 updates the first software using the software update. For instance, the first merchant device 112 can store in the software update in memory. In some instances, the first merchant device 112 stores the entire software update. In some instances, the first merchant device 112 stores a portion of the software update. For instance, the first merchant device 112 may store the second version of the second software and the third version of the third software. The first merchant device 112 can then update the first software executing on the first merchant device 112 using the updated version of the first software from the software update.

At 326, the first merchant device reboots and at 328, the first merchant device 112 detects a connection with a second merchant device 114. For instance, after updating the first software, the first merchant device 112 can reboot in order to finish the updating process on the first merchant device 112. The first merchant device 112 can detect the connection with the second merchant device 114 via a physical connection. In some instances, the first merchant device 112 detects the connection after rebooting. In some instances, the first merchant device 112 detects the connection based on a merchant connecting the second merchant device 114 to the first merchant device 112.

At 330, the first merchant device 112 sends a request for a current version of second software executing on the second merchant device 114 and at 332, the second merchant device 114 receives the request for the current version of the second software. For instance, the second merchant device 114 may include second software that the second merchant device 114 executes to provide the POS functionality of the second merchant device 114. For instance, the second software can provide the second merchant device 114 with functionality to receive input associated with payment information from customers. Based on detecting the connection with the second merchant device 114, the first merchant device 112 can send, via the physical connection, the second merchant device 114 a message requesting the current version of the second software.

At 334, the second merchant device 114 sends an indication of the current version of the second software to the first merchant device 112 and at 336, the first merchant device 112 receives the indication of the current version of the second software from the second merchant device 114. For instance, based on receiving the request from the first merchant device 112, the second merchant device 114 can send, via the physical connection, the first merchant device 112 a message that indicates the current version of the second software executing on the second merchant device 114.

At 338, the first merchant device 112 determines to update the second merchant device 114. For instance, the first merchant device 112 can compare the current version of the second software executing on the second merchant device 114 to the updated version of the second software from the software update. Based on the comparison, the first merchant device 112 can determine that the second merchant device 114 is executing a previous version of the second software (i.e., a version before the updated version of the second software). In response, the first merchant device 112 can determine to update the second merchant device 114.

At 340, the first merchant device 112 causes the second merchant device 114 to reboot in an update mode and at 342, the second merchant device 114 reboots in the update mode. For instance, the first merchant device 112 can cause the second merchant device to lose power. In some instances, the first merchant device 112 can then turn a pin on within the physical connection that causes the second merchant device 114 to reboot in the update mode, and then turn the power back on to the second merchant device 114. In response, the second merchant device 114 can reboot in the update mode. In some instances, rebooting in the update mode can include the second merchant device 114 not booting the operating system.

At 344, the first merchant device 112 sends at least a portion of the software update to the second merchant device 114 and at 346, the second merchant device 114 receives the at least the portion of the software update. For instance, based on the second merchant device 114 being in the update mode, the first merchant device 112 can send, via the physical connection, the second merchant device 114 the software update and/or at least a portion of the software update. If the first merchant device 112 only sends a portion of the software update, the portion can include the second version of the second software and the third version of the third software.

At 348, the second merchant device 114 updates the second software using the at least the portion of the software update and at 350, the second merchant device 114 reboots in a payments mode. For instance, the second merchant device 114 can use the second version of the second software from the software update to update the second software on the second merchant device 114. In some instances, the update can include a flash update in which the second merchant device 114 overwrites the second software on the second merchant device 114 with the updated version of the second software from the software update. In response to updating the second software, the second merchant device 114 can then reboot in the payments mode so that the second merchant device 114 can once again receive payment information from customers.

In some instances, during and/or after the second merchant device 114 reboots into the payments mode, the second merchant device 114 can use the software update to update a secure enclave on the second merchant device 114. Such a process is described in detail below with regard to FIGS. 5A-5B.

Figure 4A:
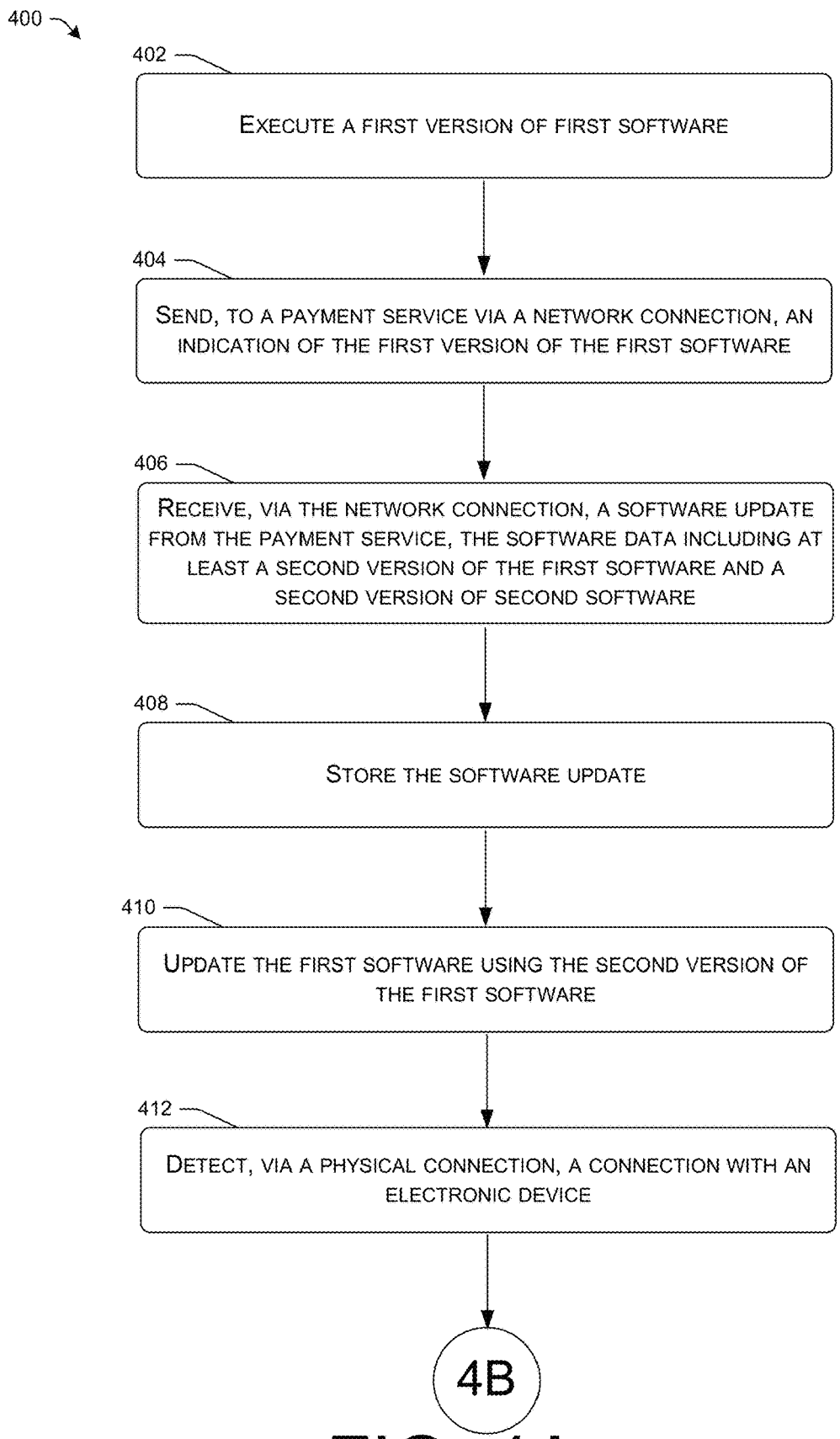
FIGS. 4A-4B illustrate a flow diagram of an example process of a merchant-facing device updating first software using a software update, and then the merchant-facing device causing a buyer-facing device to update second software using the software update.
Figure 4B:
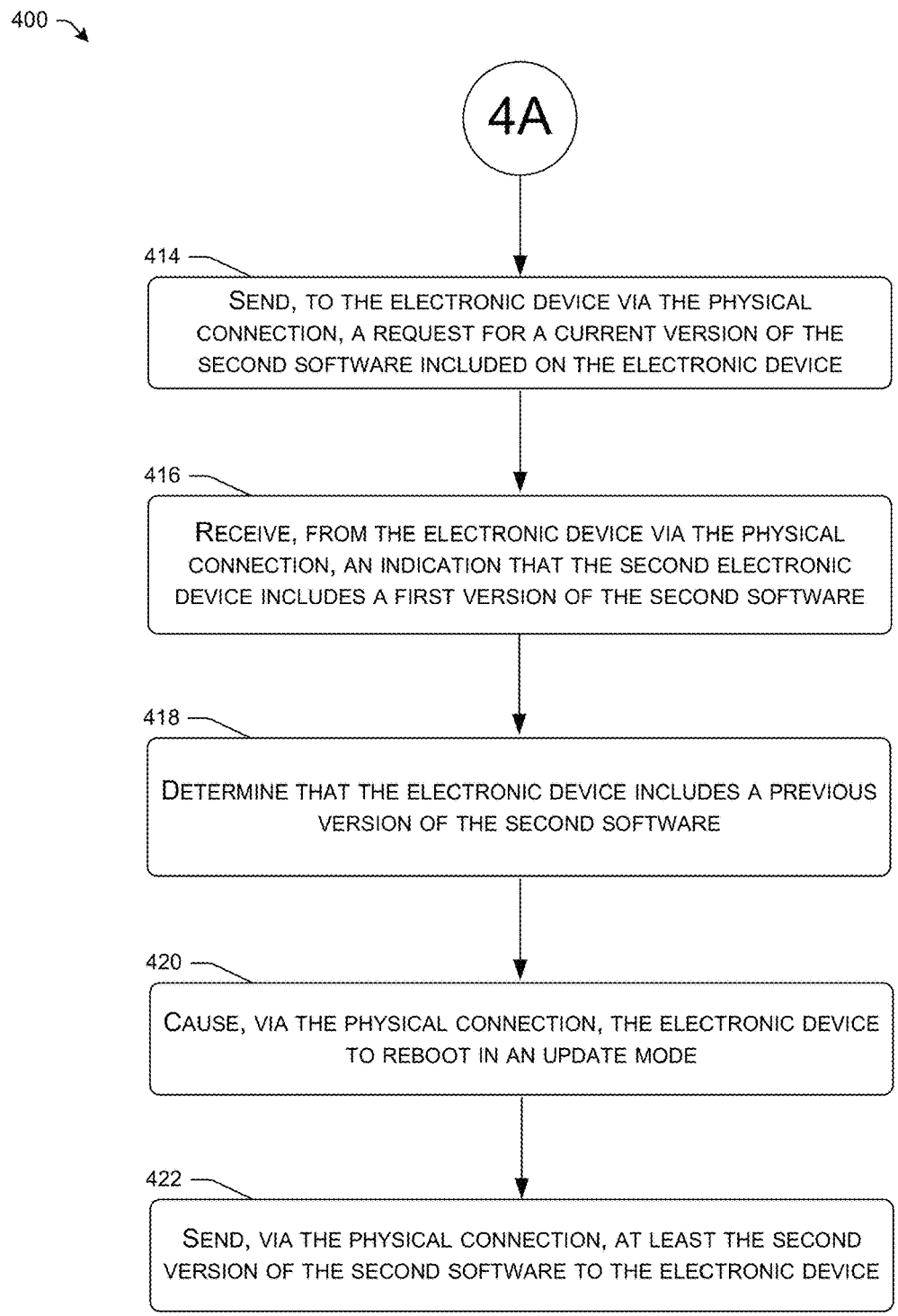

FIGS. 4A-4B illustrate a flow diagram of an example process 400 of a merchant-facing device updating first software using a software update, and then the merchant-facing device causing a buyer-facing device to update second software using the software update. At 402, a first merchant device 112 executes a first version of first software. For instance, the first merchant device 112 may include the merchant-facing device and execute first software that provides the first merchant device 112 with POS functionality. In some instances, the POS functionality can allow the first merchant device 112 to receive information from a merchant during a transaction between the merchant and a customer. For instance, the merchant can input information indicating at least one or more items being purchased by the customer and a cost associated with the one or more items.

At 404, the first merchant device 112 sends, to a payment service 108 via a network connection, an indication of a first version of the first software. For instance, the first merchant device may determine that the first version of the first software is executing on the first merchant device 112 and, in response, send an indication of the first version of the payment service 108. In some instances, the first merchant device 112 may send the indication based on receiving a message requesting the current version of the first software from the payment service 108. In some instance, the first merchant device 112 may send the indication based on the first merchant device 112 connecting to the payment service 108 via the network(s) 120. Still, in some instances, the first merchant device 112 may send the indication based on a lapse of a set time period.

At 406, the first merchant device 112 receives, via the network connection, a software update from the payment service 108, the software update including at least a second version of the first software and a second version of second software. For instance, based on sending the payment service 108 the indication of the first version, the first merchant device 112 can receive the software update from the payment service 108. The payment service 108 may send the software update based on determining that the first version of the first software is a previous version of the first software.

At 408, the first merchant device 112 stores the software update and at 410, the first merchant device 112 updates the first software using the second version of the first software. For instance, based on receiving the software update, the first merchant device 112 can store the software update in memory. The first merchant device 112 can then use the second version of the first software that is included in the software update to update the first software executing on the first merchant device 112 to the second version. In some instances, the first merchant device 112 then reboots in order to finish the process of updating the first software.

At 412, the first merchant device 112 detects, via a physical connection, a connection with an electronic device. For instance, the first merchant device 112 can detect the connection with a second merchant device 114 that executes the second software in order to provide the second merchant device 114 with POS functionality. The first merchant device 112 can detect the connection with the second merchant device 114 via a physical connection. In some instances, the first merchant device 112 detects the connection after rebooting. In some instances, the first merchant device 112 detects the connection based on a merchant connecting the second merchant device 114 to the first merchant device 112.

At 414, the first merchant device 112 sends, to the electronic device via the physical connection, a request for a current version of second software included on the electronic device. For instance, based on detecting the second merchant device 114, the first merchant device 112 can send a message to the second merchant device 114 that request the current version of the second software. The first merchant device 112 can send the message to the second merchant device 114 via the physical connection.

At 416, the first merchant device 112 receives, from the electronic device via the physical connection, an indication that the electronic device includes a first version of the second software. For instance, based on sending the message, the first merchant device 112 can receive a message back from the second merchant device 114 that indicates that the second merchant device 114 is includes the first version of the second software. The first merchant device 112 can receive the message via the physical connection.

At 418, the first merchant device 112 determines that the electronic device includes a previous version of the second software. For instance, the first merchant device 112 can compare the first version of the second software that the second merchant device 114 includes to the second version of the second software from the software update. Based on the comparison, the first merchant device 112 can determine that the second merchant device 114 includes a previous version of the second software.

At 420, the first merchant device 112 causes, via the physical connection, the electronic device to reboot in an update mode. For instance, based on determining that the second merchant device 114 is executing a previous version of the second software, the first merchant device 112 can cause, via the physical connection, the second merchant device 114 to reboot in an update mode in which the second merchant device 114 can be updated.

At 420, the first merchant device 112 sends, via the physical connection, at least the second version of the second software to the electronic device. For instance, the first merchant device 112 can send, via the physical connection, the second version of the second software to the second merchant device 114. In response, the second merchant device 114 can perform a flash update in order to update the second software executing on the second merchant device 114. The second merchant device 114 can then reboot back into a payments mode after updating the second software.

Figure 5A:
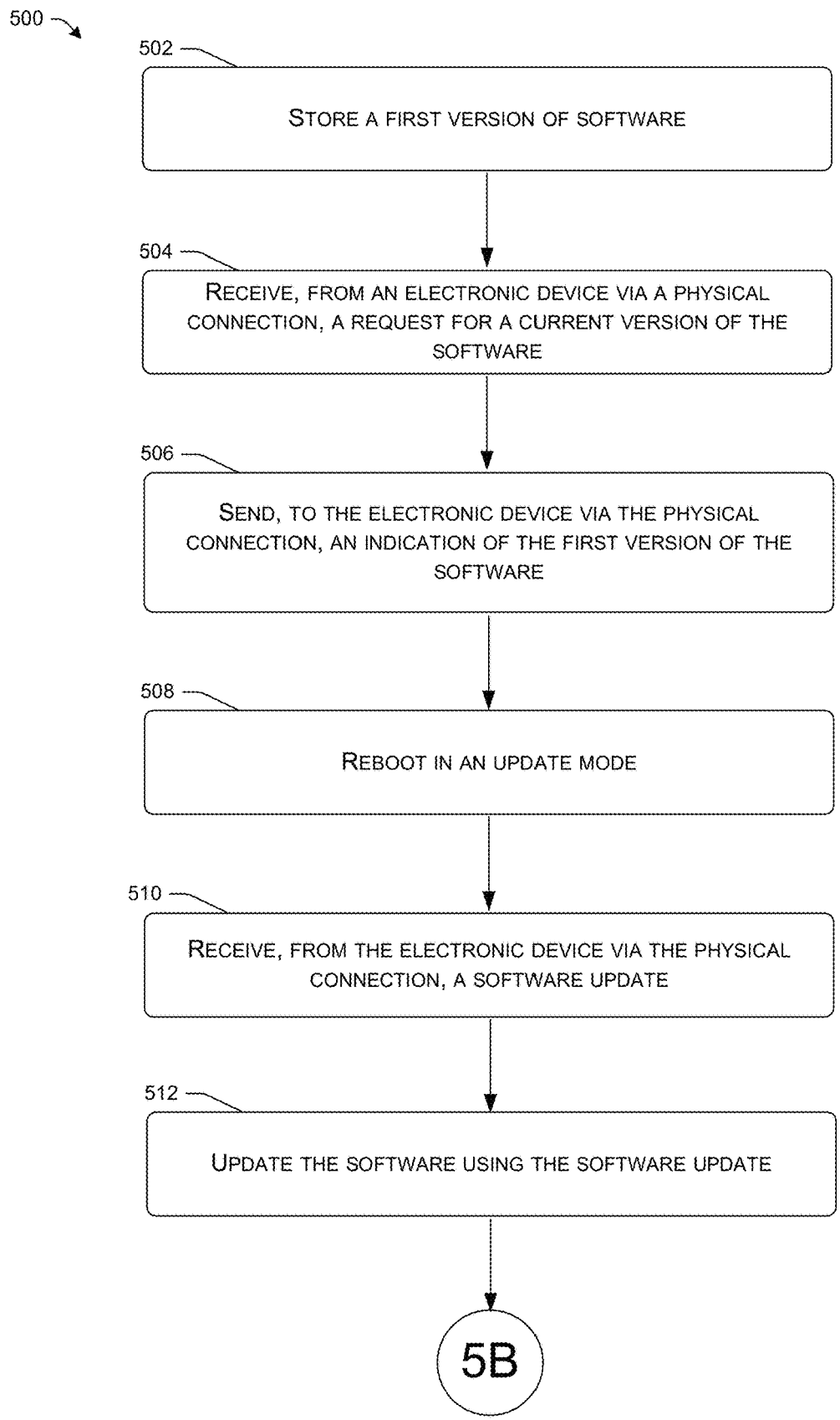
FIGS. 5A-5B illustrate a flow diagram of an example process of a buyer-facing device updating software using a software update that is received from a merchant-facing device.
Figure 5B:
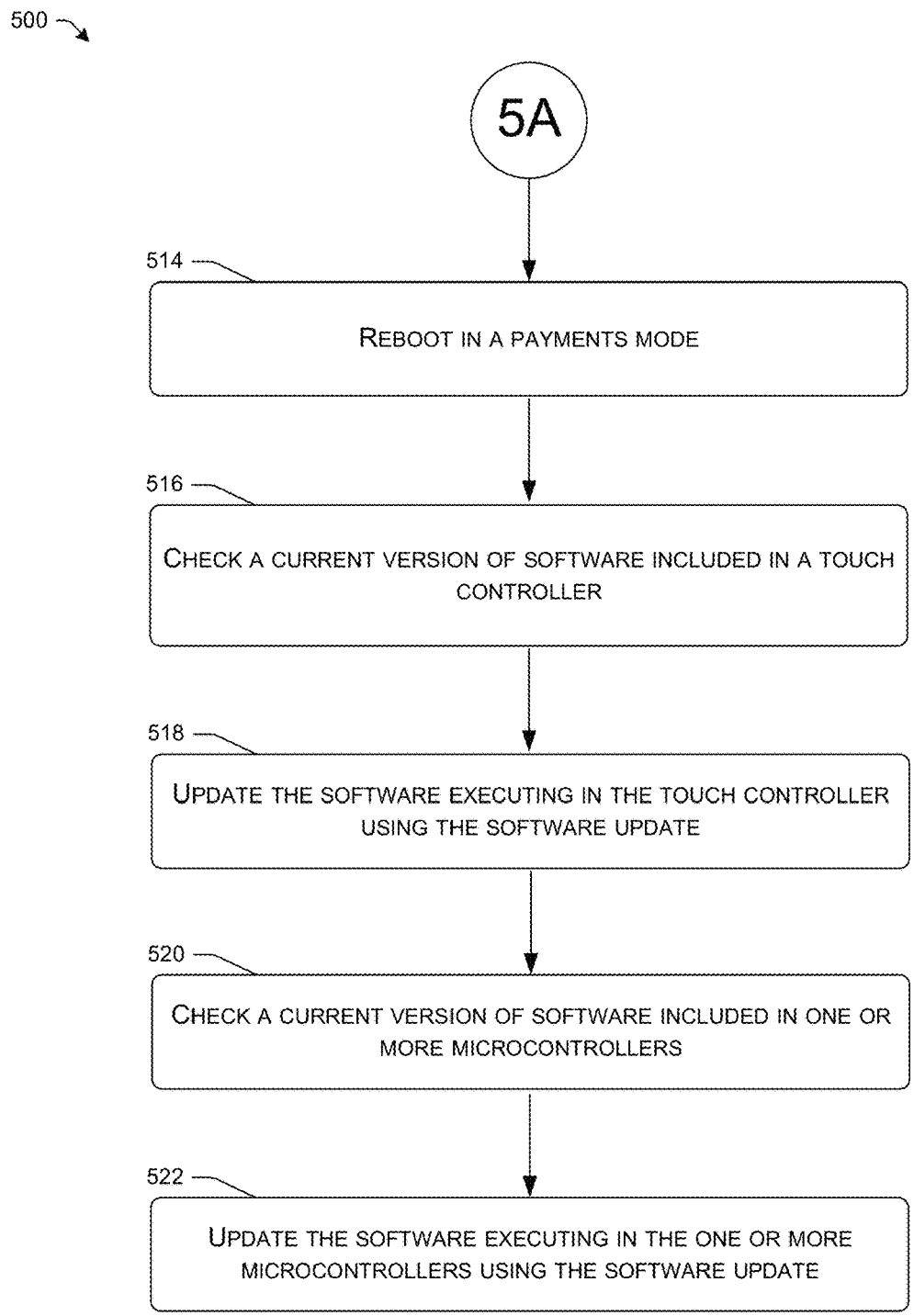

FIGS. 5A-5B illustrate a flow diagram of an example process of a buyer-facing device updating software using a software update that is received from a merchant-facing device. At 502, a second merchant device 114 stores a first version of software. For instance, the second merchant device 114 may include software that the second merchant device 114 executes to provide POS functionality of the second merchant device 114. For instance, the software can provide the second merchant device 114 with functionality to receive input associated with payment information from customers.

At 504, the second merchant device 114 receives, from an electronic device via a physical connection, a request for a current version of the software and at 506, the second merchant device 114 sends, to the electronic device via the physical connection, an indication of the first version of the software. For instance, based on having a connection with a first merchant device 112, the second merchant device 114 can receive a message from the first merchant device 112 requesting the current version. In response, the second merchant device 114 can send a message to the first merchant device 112 indicating that the second merchant device 114 is executing the first version of the software.

At 508, the second merchant device 114 reboots in an update mode. For instance, the second merchant device 114 may lose power and as such turn to an off mode. The second merchant device 114 may then once again receive power and in response, reboot. While rebooting, the second merchant device 114 may determine that a pin associated with the physical connection is flipped and based on the determination, reboot in the update mode. To reboot in the update mode, the second merchant device 114 may not boot the operating system of the second merchant device 114.

At 510, the second merchant device 114 receives, from the electronic device via the physical connection, a software update and at 512, the second merchant device 114 updates the software using the software update. For instance, the second merchant device 114 may receive the software update while in the update mode, where the software update includes a second version of the software. The second merchant device 114 can then perform a flash update by overwriting the first version of the software executing on the second merchant device 114 with the second version of the software from the software update.

At 514, the second merchant device 114 reboots in a payments mode. For instance, based on updating the software, the second merchant device 114 can reboot in order to complete the process of updating the software on the second merchant device 114. In some instances, the second merchant device 114 can reboot in a payments mode in which the second merchant device 114 can receive input from customers.

At 516, the second merchant device 114 can check a current version of software included in a touch controller. For instance, the second merchant device 114 can determine the current version of the software executing in the touch controller, where the touch controller is located in a secure enclave of the second merchant device 114. The second merchant device 114 can then determine, using the software update, that the current version of the software includes a previous version of the software. For instance, the second merchant device 114 can determine that the software update includes a newer version of the software by comparing the current version of the software to the version of the software within the software update.

At 518, the second merchant device 114 updates the software executing in the touch controller using the software update. For instance, the second merchant device 114 can cause the secure enclave to operate in an update mode. The second merchant device 114 can then cause a flash update of the software in the touch controller using the updated version of the software that is included in the software update. After updating the software in the touch controller, the second merchant device 114 can cause the secure enclave to again operate in a payments mode.

At 520, the second merchant device 114 can check a current version of software included in one or more microcontrollers. For instance, the second merchant device 114 can determine the current version of the software executing in the one or more microcontrollers, where the one or more microcontrollers are located in the secure enclave of the second merchant device 114. The second merchant device 114 can then determine, using the software update, that the current version of the software includes a previous version of the software. For instance, the second merchant device 114 can determine that the software update includes a newer version of the software by comparing the current version of the software to the version of the software within the software update.

At 522, the second merchant device 114 updates the software executing in the one or more microcontrollers using the software update. For instance, the second merchant device 114 can cause the secure enclave to operate in the update mode. The second merchant device 114 can then cause a flash update of the software in the one or more microcontrollers using the updated version of the software that is included in the software update. After updating the software in the touch controller, the second merchant device 114 can cause the secure enclave to again operate in a payments mode.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A system comprising:
   one or more processors; and
   non-transitory computer-readable media storing instructions that, when executed by the one or more processors, cause the one or more processors to perform operations comprising:
   receiving, by a first point-of-sale (POS) device via a first connection, a software update from a server, the software update including an updated version of first software for the first POS device and an updated version of second software for a second POS device;
   updating, by the first POS device, a current version of the first software on the first POS device using the updated version of the first software;
   detecting, by the first POS device, a second connection with the second POS device;
   based at least in part on detecting the second connection, sending, by the first POS device to the second POS device and via the second connection, a request for data indicating a current version of the second software on the second POS device;
   receiving, by the first POS device from the second POS device and via the second connection, an indication of the current version of the second software on the second POS device;
   causing, by the first POS device and based at least in part on the indication of the current version of the second software on the second POS device, the second POS device to operate in an update mode; and
   based at least in part on the second POS device operating in the update mode, sending, by the first POS device and via the second connection, the updated version of the second software to the second POS device.

2. The system of claim 1, the operations further comprising receiving, by the second POS device from the first POS device and via the second connection, the updated version of the second software while operating in the update mode.

3. The system of claim 1, the operations further comprising:
   storing a preference associated with the second POS device;
   determining that the second POS device has rebooted into a payments mode; and
   sending, via the second connection, data associated with the preference to the second POS device.

4. The system of claim 2, wherein the second POS device includes a secure payments enclave and the software update includes an updated version of third software, and the operations further comprise:
   determining that a microcontroller within the secure payments enclave includes a previous version of the third software; and
   causing the third software to be updated to the updated version of the third software using the software update.

5. The system of claim 2, the operations further comprising:
   detecting, by the first POS device, a third connection with a third POS device;
   receiving, by the first POS device and from the third POS device, an indication that the third POS device includes the updated version of the second software; and
   determining to refrain from sending the updated version of the second software to the third POS device.

6. The system of claim 1, the operations further comprising:
   receiving, from the second POS device, an indication that the second software has been updated; and
   causing, based at least in part on receiving the indication that the second software has been updated, the second POS device to reboot into a payments mode.

7. The system of claim 1, wherein the software update is encrypted using a first encryption key, and the operations further comprise:

receiving, by the first POS device and via the first connection, an encrypted version of the first encryption key;
decrypting, by the first POS device, the encrypted version of the first encryption key using a second encryption key associated with the first POS device; and
decrypting, by the first POS device, the software update using the first encryption key.

8. The system of claim 1, the operations further comprising:
determining, when the software update is received at the first POS device, that the second connection to the second POS device is absent;
storing the software update at the first POS device;
detecting the second connection to the second POS device; and
wherein sending the updated version of the second software to the second POS device is based at least in part on detecting the second connection to the second POS device.

9. The system of claim 2, the operations further comprising:
identifying, at the first POS device, a first portion of the software update corresponding to the updated version of the second software;
storing the first portion of the software update at the first POS device; and
discarding a second portion of the software update corresponding to the updated version of the first software in response to updating the current version of the first software.

10. The system of claim 2, wherein the software update further includes an updated version of third software, and the operations further comprise:
determining that a touch controller within a secure enclave of the second POS device includes a previous version of the third software; and
sending, to the second POS device, the updated version of the third software.

11. A method comprising:
receiving, by a first point-of-sale (POS) device via a first connection, a software update including an updated version of first software for the first POS device and an updated version of second software for a second POS device;
updating a current version of the first software on the first POS device using the updated version of the first software;
detecting, by the first POS device, a second connection with the second POS device;
based at least in part on detecting the second connection, requesting, by the first POS device, an indication of a current version of the second software on the second POS device;
causing, by the first POS device, the second POS device to operate in an update mode based at least in part on receiving the indication of the current version of the second software on the second POS device; and
based at least in part on detecting the second connection and the second POS device operating in the update mode, sending, by the first POS device and via the second connection, the updated version of the second software to the second POS device.

12. The method of claim 11 further comprising receiving, by the second POS device from the first POS device and via the second connection, the updated version of the second software while operating in the update mode.

13. The method of claim 11 further comprising:
storing a preference associated with at least one of the first POS device or the second POS device;
determining that the second POS device has rebooted into a payments mode; and
sending, via the second connection, data associated with the preference to the second POS device.

14. The method of claim 11, wherein the second POS device includes a secure payments enclave and the software update includes an updated version of third software, and the method further comprises:
determining that a microcontroller within the secure payments enclave is associated with a previous version of the third software; and
causing, based at least in part on the microcontroller being associated with the previous version of the third software, the third software to be updated to the updated version of the third software.

15. The method of claim 11 further comprising:
detecting, by the first POS device, a third connection with a third POS device;
receiving, by the first POS device and from the third POS device, an indication that the third POS device includes the updated version of the second software; and
determining to refrain from sending the updated version of the second software to the third POS device.

16. The method of claim 11 further comprising:
receiving, from the second POS device, an indication that the second software has been updated; and
causing, based at least in part on receiving the indication that the second software has been updated, the second POS device to operate in a payments mode.

17. The method of claim 11, wherein the software update is encrypted using a first encryption key, and the method further comprises:
receiving, by the first POS device and via the first connection, an encrypted version of the first encryption key;
decrypting, by the first POS device, the encrypted version of the first encryption key using a second encryption key associated with the first POS device; and
decrypting, by the first POS device, the software update using the first encryption key.

18. The method of claim 11 further comprising:
determining, when the software update is received at the first POS device, that the second connection to the second POS device is absent;
storing the software update at the first POS device;
detecting the second connection to the second POS device; and
wherein sending the updated version of the second software to the second POS device is based at least in part on detecting the second connection to the second POS device.

19. The method of claim 11 further comprising:
Identifying, at the first POS device, a first portion of the software update corresponding to the updated version of the second software;
storing the first portion of the software update at the first POS device; and
causing a second portion of the software update corresponding to the updated version of the first software to be removed from the first POS device in response to updating the current version of the first software.

20. The method of claim 11, wherein the software update further includes an updated version of third software, and the method further comprises:

determining that a touch controller within a secure enclave of the second POS device includes a previous version of the third software; and sending, based at least in part on the touch controller including the previous version of the third software, the updated version of the third software to the second POS device.

* * * * *